United States Patent
Kida et al.

(10) Patent No.: US 11,947,749 B2
(45) Date of Patent: Apr. 2, 2024

(54) IN-CELL TOUCH PANEL

(71) Applicant: Sharp Display Technology Corporation, Kameyama (JP)

(72) Inventors: Kazutoshi Kida, Kameyama (JP); Kiyoshi Minoura, Kameyama (JP); Takashi Satoh, Kameyama (JP); Shunsuke Noichi, Kameyama (JP); Yasuhiro Sugita, Kameyama (JP); Chiaki Minari, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 17/752,561

(22) Filed: May 24, 2022

(65) Prior Publication Data

US 2022/0382098 A1 Dec. 1, 2022

(30) Foreign Application Priority Data

May 26, 2021 (JP) ................. 2021-088562

(51) Int. Cl.
 *G06F 3/041* (2006.01)
 *G02F 1/1333* (2006.01)
 *G06F 3/044* (2006.01)
 *G02F 1/1335* (2006.01)

(52) U.S. Cl.
 CPC ........ *G06F 3/0412* (2013.01); *G02F 1/13338* (2013.01); *G06F 3/0416* (2013.01); *G06F 3/0445* (2019.05); *G06F 3/0446* (2019.05); *G02F 1/133553* (2013.01)

(58) Field of Classification Search
 CPC .... G06F 3/0412; G06F 3/0445; G06F 3/0446; G06F 3/0416; G02F 1/13338; G02F 1/133553
 See application file for complete search history.

(56) References Cited

U.S. PATENT DOCUMENTS

| | | | |
|---|---|---|---|
| 2012/0056835 A1 | 3/2012 | Choo et al. | |
| 2015/0002752 A1* | 1/2015 | Shepelev | G06F 3/0412 349/12 |
| 2015/0309631 A1* | 10/2015 | Wang | G06F 1/16 345/174 |
| 2018/0136502 A1* | 5/2018 | Mugiraneza | G02F 1/133512 |
| 2019/0018535 A1* | 1/2019 | Kitamura | G06F 3/0416 |
| 2021/0181576 A1 | 6/2021 | Sasaki et al. | |

FOREIGN PATENT DOCUMENTS

| | | |
|---|---|---|
| JP | 2012-059265 A | 3/2012 |
| JP | 2021-096461 A | 6/2021 |

\* cited by examiner

*Primary Examiner* — Liliana Cerullo
(74) *Attorney, Agent, or Firm* — ScienBiziP, P.C.

(57) ABSTRACT

An in-cell touch panel device includes a first substrate, a plurality of color filters formed on a layer on an opposite side of a touch surface with respect to the first substrate, a transmitter electrode formed on a layer on an opposite side of the touch surface with respect to the plurality of color filters, a receiver electrode formed on a layer closer to the touch surface side with respect to the plurality of color filters, and a second substrate, a pixel electrode being disposed on the second substrate. The transmitter electrode includes a gap portion formed in a portion overlapping a space between adjacent ones of the plurality of color filters in a plan view.

8 Claims, 30 Drawing Sheets

IN-CELL TOUCH PANEL

CROSS-REFERENCE TO RELATED APPLICATIONS

This application claims the benefit of priority to Japanese Patent Application Number 2021-088562 filed on May 26, 2021. The entire contents of the above-identified application are hereby incorporated by reference.

BACKGROUND

Technical Field

The disclosure relates to an in-cell touch panel.

In the related art, an in-cell touch panel including a touch panel is known. Such an in-cell touch panel is disclosed in, for example, JP 2012-059265 A.

The in-cell touch panel of JP 2012-059265 A includes a thin film transistor substrate, a touch sensor array, a thin film transistor array, a color filter substrate, and a color filter array. The touch sensor array and the thin film transistor array are formed on the thin film transistor substrate. The color filter array is formed on the color filter substrate. The in-cell touch panel alternately executes, in one frame period, a display mode in which the thin film transistor array is driven and a touch sensing mode in which the touch sensor array is driven.

Here, in a case where the touch sensor array is provided on the thin film transistor substrate, and other electrodes (conductors) are provided between the touch sensor array and the color filter substrate, the electrical field formed between the touch sensor array and a pointer is shielded by the other electrodes. In order to prevent this, in a case where the transmitter electrode and the receiver electrode constituting the touch sensor axe formed on the color filter substrate, there is a problem that the transmitter electrode and the receiver electrode may be short-circuited via a gap between adjacent ones of the color filters.

Thus, the disclosure has been made to solve the above-described problems, and an object of the disclosure is to provide an in-cell touch panel capable of preventing the transmitter electrode and the receiver electrode from being short-circuited even when the transmitter electrode and the receiver electrode are formed on the substrate on which the color filter is formed.

In order to solve the problems described above, an in-cell touch panel according to an aspect of the disclosure includes a first substrate, a plurality of color filters formed on a layer on an opposite side of a touch surface with respect to the first substrate, a transmitter electrode formed on one of a layer on an opposite side of the touch surface with respect to the plurality of color filters and a layer closer to the touch surface side with respect to the plurality of color filters, a receiver electrode formed on the other of the layer on the opposite side of the touch surface with respect to the plurality of color filters and the layer closer to the touch surface side with respect to the plurality of color filters, and a second substrate disposed to face the first substrate, a pixel electrode being disposed on the second substrate, wherein at least one of the transmitter electrode and the receiver electrode includes a gap portion formed in a portion overlapping a space between adjacent ones of the plurality of color filters in a plan view.

According to the configuration described above, the in-cell touch panel capable of preventing the transmitter electrode and the receiver electrode from being short-circuited can be provided even when the transmitter electrode and the receiver electrode are formed on the first substrate on which the color filter is formed.

BRIEF DESCRIPTION OF DRAWINGS

The disclosure will be described with reference to the accompanying drawings, wherein like numbers reference like elements.

DESCRIPTION OF EMBODIMENTS

Figure 1:
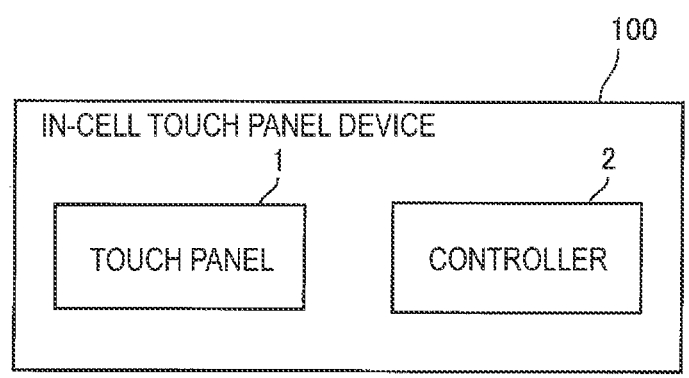
FIG. 1 is a block diagram illustrating a functional configuration of an in-cell touch panel device 100 according to a first embodiment.

Hereinafter, embodiments the disclosure will be described in detail with reference to the drawings. In the drawings, the same or corresponding portions are denoted by the same reference numerals and signs, and the description thereof will not be repeated. Note that, for ease of description, in the drawings referred to below, configurations may be simplified or schematically illustrated, and some components may be omitted. Furthermore, dimensional ratios between components illustrated in the drawings are not necessarily indicative of actual dimensional ratios.

First Embodiment

Figure 2:
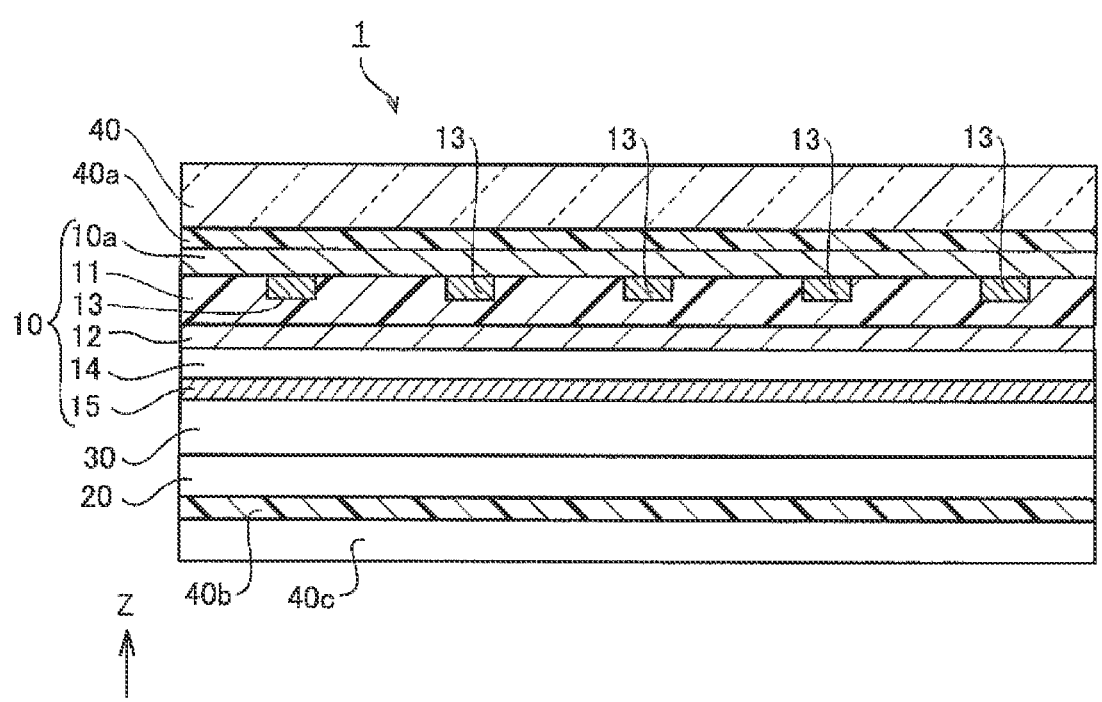
FIG. 2 is a cross-sectional view of a touch panel 1 according to the first embodiment.

A configuration of an in-cell touch panel device 100 according to a first embodiment will be described. FIG. 1 is a block diagram illustrating a functional configuration of the in-cell touch and, device 100 according to the first embodiment. FIG. 2, is a cross-sectional view of a touch panel 1 according to the first embodiment.

As illustrated in FIG. 1, the in-cell touch panel device 100 includes the touch panel 1 and a controller 2. The touch panel for example, a full in-cell type touch panel. The touch panel 1 also functions as a display panel for displaying a video or an image. The controller 2 includes a processor executing each control process in the in-cell touch panel device 100, based on a touch position acquired from the touch panel 1. Furthermore, the touch panel 1 is configured as a memory-in-pixel (MIP) type display in which a memory circuit 62 (see FIG. 7) is disposed in each of a plurality of pixels 60 (see FIG. 7).

As illustrated in FIG. 2, the touch panel 1 includes a color filter substrate 10, an active matrix substrate 20 disposed to face the color filter substrate 10, and a liquid crystal layer 30 interposed between the color filter substrate 10 and the active matrix substrate 20. Furthermore, a pair of polarizers 40a and 40b are provided to sandwich the color filter substrate 10 and the active matrix substrate 20. Furthermore, a cover glass 40 is provided on a front side (a touch surface side being touched by the pointer) of the color filter substrate 10 via the polarizer 40a. Furthermore, a backlight 40c is provided on a rear side of the active matrix substrate 20 via the polarizer 40b. Note that the "touch surface" in the disclosure refers to a front face of the color filter substrate 10 (front face of the cover glass 40).

Here, in the first embodiment, as illustrated in FIG. 2, the color filter substrate 10 includes a first substrate 10a, a color filter 11, a transmitter electrode 12, a receiver electrode 13, an overcoat film 14, and a common electrode 15. The color filter 11 is formed on an upper layer with respect to the first substrate 10a. Note that in the specification of the present application, a description is given by assuming that "upper" in the color filter substrate 10 refers to the liquid crystal layer 30 side (an opposite side of the touch surface), and "lower" in the color filter substrate 10 refers to the cover glass 40 side (touch surface side). Furthermore, a description is given by assuming that "upper" in the active matrix substrate 20 refers to the liquid crystal layer 30 side (touch surface side), and "lower" refers to the backlight 40c side (an opposite side of the touch surface).

The color filter 11 is formed on an upper layer with respect to the first substrate 10a. The transmitter electrode 12 is formed on the upper layer of the color filter 11. The receiver electrode 13 is formed on the lower layer of the color filter 11. The overcoat film 14 is formed on the upper layer with respect to the color filter 11 and on the upper layer with respect to the transmitter electrode 12. The common electrode 15 is formed on the upper layer with respect to the overcoat film 14. Here, in a case where at least one of the transmitter electrode or the receiver electrode is formed closer to the active matrix substrate 20 side (upper layer) with respect to the common electrode 15, an electrical field formed between the transmitter electrode or the receiver electrode formed on the upper layer and the pointer is shielded by the common electrode 15. In contrast, according to the configuration described above, the common electrode 15 is formed on the upper layer with respect to the transmitter electrode 12 and the receiver electrode 13, and thus the electrical field formed between the transmitter electrode 12 or the receiver electrode 13 and the pointer can be prevented from being shielded by the common electrode 15. As a result, even when the liquid crystal layer 30 is driven by the vertical alignment (VA) type, a VA type display can be configured as the in-cell touch panel device 100.

Figure 3:
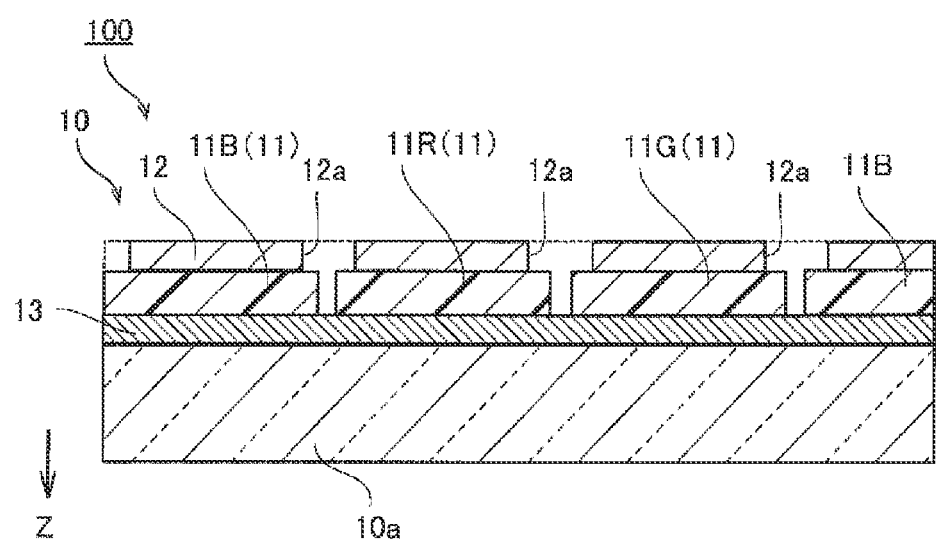
FIG. 3 is a cross-sectional view of a portion of a color filter substrate 10 for describing a configuration of a transmitter electrode 12 and a receiver electrode 13.

FIG. 3 is a cross-sectional view of portion of the color filter substrate 10 for describing a configuration or the transmitter electrode 12 and the receiver electrode 13. The first substrate 10a is, for example, a glass substrate having insulating properties. As illustrated in FIG. 3, a plurality of the color filters 11 are provided. Each of the plurality of color filters 11 includes a color resist. The plurality of color filters 11 include a green color filter 11G, a red color filter 11R, and a blue color filter 11B. Here, a black matrix is not provided between adjacent ones of the plurality of color filters 11. As a result, a decrease in brightness of the touch panel 1 due to the black matrix is prevented.

The transmitter electrode 12, the receiver electrode 13, and the common electrode 15 are formed of, for example, a transparent electrode (indium tin oxide (ITO), for example). Furthermore, the overcoat film 14 illustrated in FIG. 2 is formed of a transparent resin material. The common electrode 15 is disposed to face a pixel electrode 21 (see FIG. 4) of the active matrix substrate 20, and generates an electrical field between the pixel electrode 21 and the common electrode 15. The common electrode 15 is provided in common to a plurality of the pixel electrodes 21. As a result, the touch panel 1 according to the first embodiment is driven by the VA type.

Figure 4:
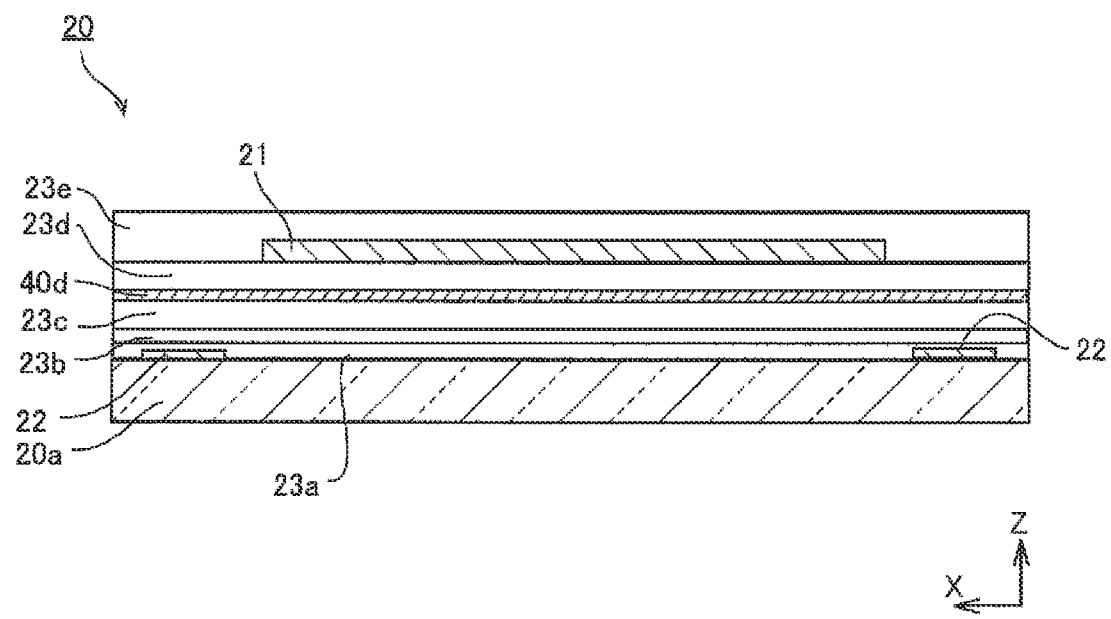
FIG. 4 is a cross-sectional view of an active matrix substrate 20 along an X direction.
Figure 5:
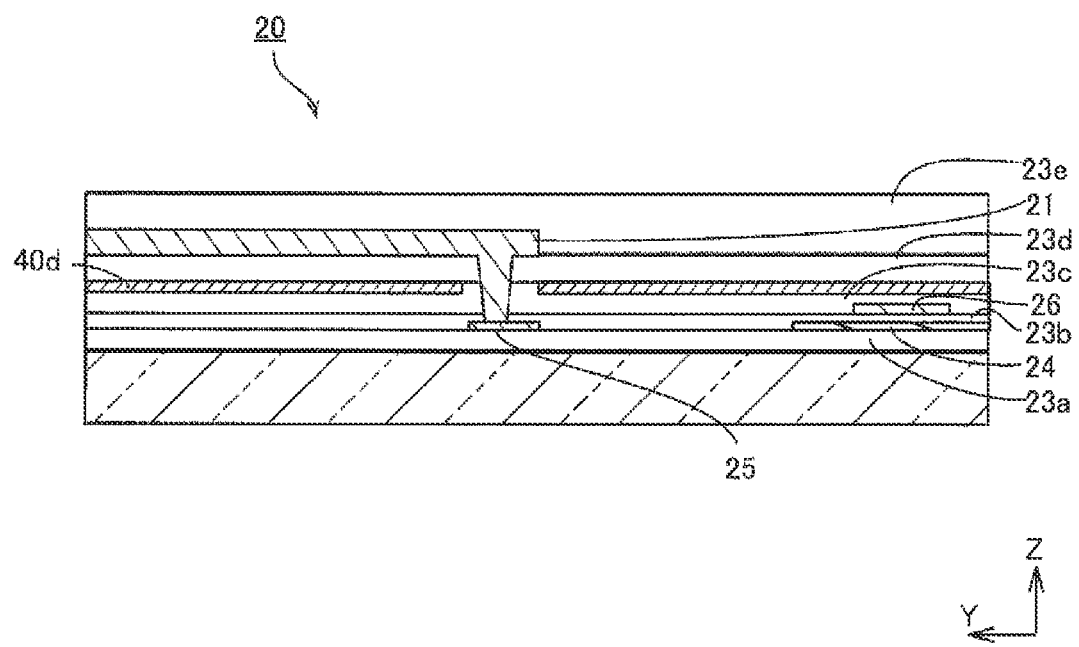
FIG. 5 is a cross-sectional view of the active matrix substrate 20 along a Y direction.
Figure 6:
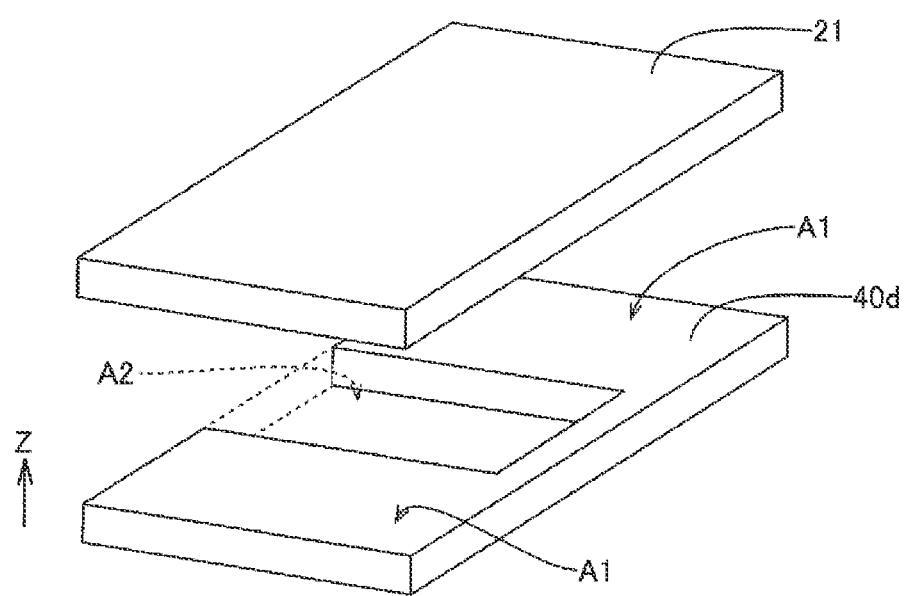
FIG. 6 is a schematic view for describing a reflective region A1 and a transmission region A2 in the touch panel 1.

FIG. 4 is a cross-sectional view of the active matrix substrate 20 along an X direction. FIG. 5 is a cross-sectional view of the active matrix substrate 20 along a Y direction. FIG. 6 is a schematic view for describing a reflective region A1 and a transmission region A2 in the touch panel 1. As illustrated in FIG. 4, the active matrix substrate 20 is provided with a reflector 40d, and the touch panel 1 is configured as a reflection type display. Accordingly, the touch panel 1 according to the first embodiment is a hybrid type touch panel of a reflection type and a transmission type for displaying an image or a video, using reflected light by the reflector 40d and light (transmitted light) from the backlight 40c.

As illustrated in FIG. 2, the backlight 40c is provided on a rear face of the polarizer 40b. The reflector 40d reflects light incident from the color filter substrate 10 side. Furthermore, the backlight 40c emits light on the color filter substrate 10 side. As illustrated in FIG. 6, the reflector 40d includes the reflective region A1 and the transmission region A2. For example, a recessed portion (or hole portion) through which light from the backlight 40c passes though in a Z direction is formed in a central portion in the reflector 40d in a plan view, and the recessed portion (or the hole portion) functions as the transmission region A2. By driving the liquid crystal layer 30, a state in which the light reflected by the reflective region A1 and the light transmitted through the transmission region A2 transmit through the liquid crystal layer 30 and a state in which the lights described above diffuse are switched. Note that FIGS. 4 and 5 are cross-sectional views in the reflective region A1.

As illustrated in FIGS. 4 and 5, a second substrate 20a, a source bus line 22, a first insulating layer 23a, a semiconductor layer 24, a memory connection line 25, a second insulating layer 23b, a gate bus line 26, a third insulating layer 23c, a reflector 40d, a fourth insulating layer 23d, the pixel electrodes 21, and a fifth insulating layer 23e are disposed on the active matrix substrate 20 in this order from the backlight 40c side. The second substrate 20a is, for example, a glass substrate having insulating properties. The pixel electrode 21 is formed of, for example, a transparent electrode (ITO). The source bus line 22, the memory connection line 25, and the gate bus line 26 contain a metal material (for example, aluminum, titanium, copper, or the like). Each of the first insulating layer 23a to the fifth insulating layer 23e is an insulating film made of an inorganic material or an organic material. The reflector 40d is formed of, for example, a metal material having light reflectivity. For example, the reflector 40d contains aluminum or an aluminum alloy. As illustrated in FIG. 5, the pixel electrode 21 is connected to the memory connection line 25.

Figure 7:
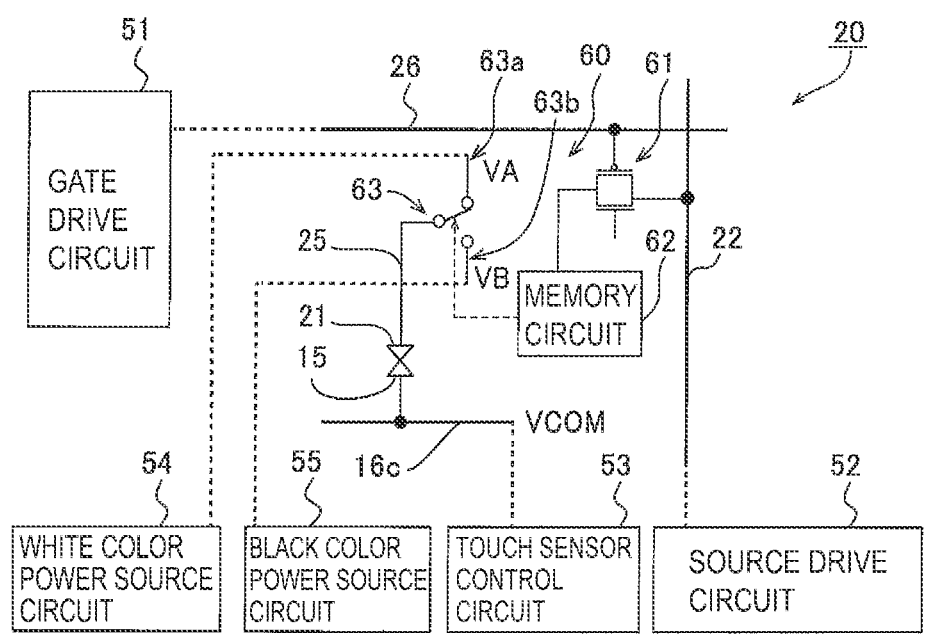
FIG. 7 is a view for describing a connection relationship between each circuit and a pixel 60 in the active matrix substrate 20.

FIG. 7 is a view for describing a connection relationship between each circuit and the pixel 60 in the active matrix substrate 20. A plurality of the gate bus lines 26 and a plurality of the source bus lines 22 intersect with each other and are formed in a lattice pattern (not illustrated) in a plan view. Furthermore, the pixels 60, each of which is a region partitioned by corresponding ones of the plurality of gate bus lines 26 and corresponding ones of the plurality or source bus lines 22, are formed in a matrix shape on the active matrix substrate 20. As illustrated in FIG. 7, a gate drive circuit 51, a source drive circuit 52, a touch sensor control circuit 53, a white color power source circuit 54, and a black color power source circuit 55 are provided on the active matrix substrate 20. The touch sensor control circuit 53, the white color power source circuit 54, and the black color power source circuit 55 are configured as, for example, one or more integrated circuits. Furthermore, the pixel 60 is provided with a thin film transistor 61, a memory circuit 62, and a switching element 63.

A gate electrode of the thin film transistor 61 is connected to the gate bus line 26, and a source electrode of the thin film transistor 61 is connected to the source bus line 22. Furthermore, a drain electrode of the thin film transistor 61 is connected to the memory circuit 62. The memory circuit 62 includes, for example, a 1 bit static random access memory (SRAM). The switching element 63 switches a state in which the pixel electrode 21 and a first wiring line 63a are connected to each other and a state in which the pixel electrode 21 and a second wiring line 63b are connected to each other, in accordance with a command from the memory circuit 62. The memory circuit 62 operates the switching element 63 based on data (data held in the memory circuit 62) written by the source drive circuit 52 via the thin film transistor 61. A gate signal is supplied from the gate drive circuit 51 to the memory circuit 62, the thin film transistor 61 is turned on, and thus data ("0" or "1") according to a source signal from the source drive circuit 52 is written.

As illustrated in FIG. 7, the touch sensor control circuit 53 is connected to the common electrode 15 via the signal line 16c. The white color power source circuit 54 is connected to the first wiring line 63a. The black color power source circuit 55 is connected to the second wiring line 63b. As a result, a voltage is constantly supplied to the pixel electrode 21 via the memory connection line 25 and the first wiring line 63a or the second wiring line 63b.

Figure 8:
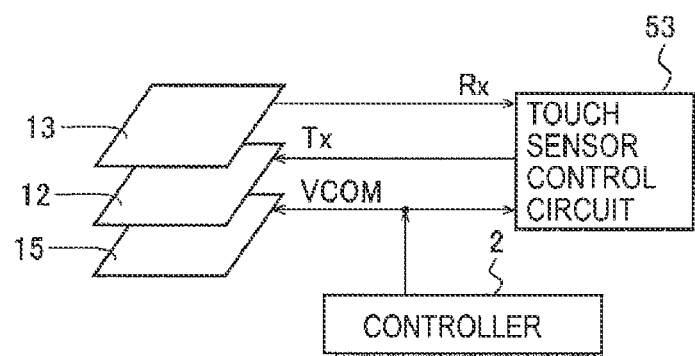
FIG. 8 is a schematic view for describing connections of the transmitter electrode 12, the receiver electrode 13, and a common electrode 15 to a touch sensor control circuit 53 and a controller 2.
Figure 9:
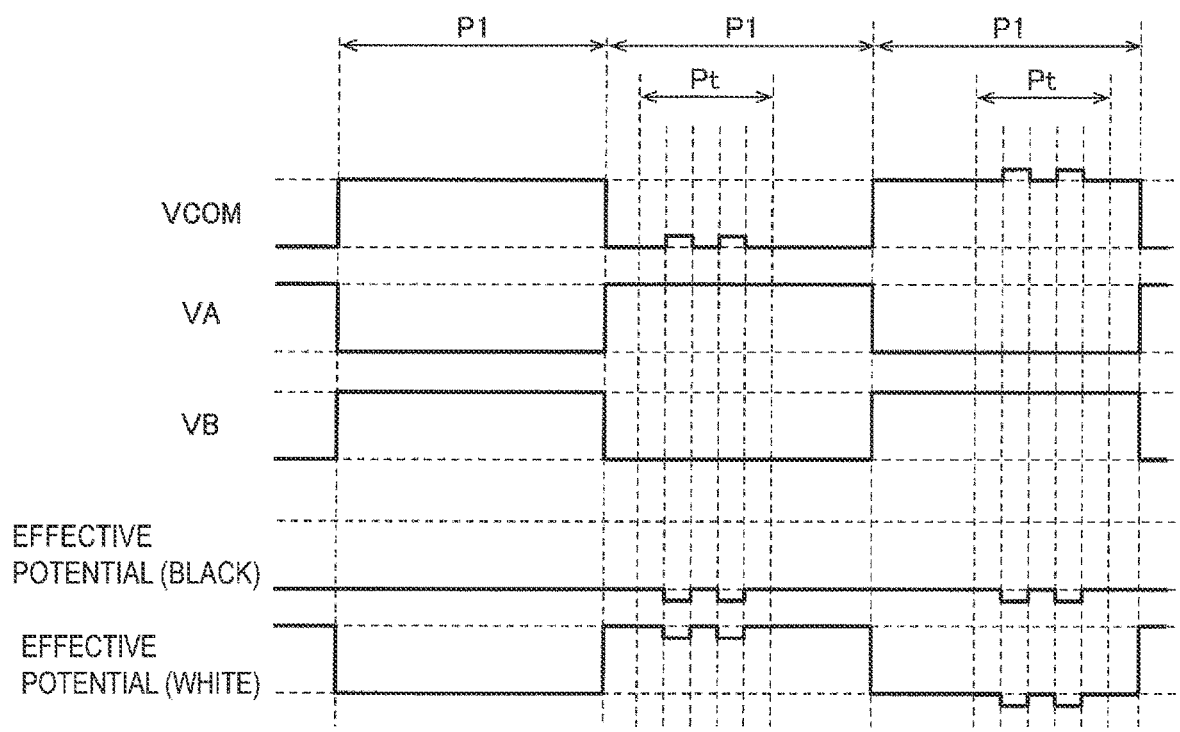
FIG. 9 is a timing chart for describing an effective potential of a pixel electrode 21 with respect to the common electrode 15.

FIG. 8 is a schematic view for describing connections of the transmitter electrode 12, the receiver electrode 13, and the common electrode 15 to the touch sensor control circuit 53 and the controller 2. FIG. 9 is a timing chart for describing an effective potential of the pixel electrode 21 with respect to the common electrode 15. As illustrated in FIG. 8, the controller 2, the touch sensor control circuit 53, and the common electrode 15 are connected to each other. A synchronization signal is suppled from the controller 2 to the touch sensor control circuit 53. The touch sensor control circuit 53 supplies a voltage VCOM to the common electrode 15, based on the synchronization signal. The voltage VCOM is a reference voltage with respect to a potential of the pixel electrode 21, and the liquid crystal layer 30 is driven by a potential difference between the potential of the pixel electrode 21 and the voltage VCOM. Furthermore, a polarity of the voltage VCOM is inverted for each predetermined period P1. In other words, a common electrode control circuit 53a performs COM inversion driving of the common electrode 15. Specifically, the "voltage VCOM" alternately repeats a state of a potential of High and a state of a potential of Low for each predetermined period P1.

Furthermore, the touch sensor control circuit 53 supplies a drive signal Tx to the transmitter electrode 12 within a period in which the data is written into the memory circuit 62. In other words, as illustrated in FIG. 9, in the in-cell touch and, device 100 according to the first embodiment, the period P1 for performing display and a touch sensor period Pt for performing a touch detection are not time-divided. The touch sensor control circuit 53 supplies the drive signal Tx to the transmitter electrode 12 in the touch sensor period Pt serving as a part of the period P1. As a result, it is not necessary to design a drive circuit in accordance with the in-cell touch panel device 100 including the memory circuit 62, and thus a general-purpose drive circuit can be used as the touch sensor control circuit 53, and versatility of the in-cell touch panel device 100 can be improved. The "drive signal Tx" is, for example, a signal for inverting the polarity of the voltage a plurality of times in the touch sensor period Pt. As illustrated in FIG. 9, the transmitter electrode 12 and the common electrode 15 are capacitively coupled to each other, and thus the voltage VCOM is slightly chanced, and the effective potential of the pixel electrode 21 with respect to the common electrode 15 is slightly changed, but there is a little influence on the display.

As illustrated in FIG. 8, the touch sensor control circuit 53 acquires a detection signal Rx from the receiver electrode 13. In a case where the pointer touches the touch panel 1, the mutual capacitance between the transmitter electrode 12 and the receiver electrode 13 changes, and a waveform of the detection signal Rx fluctuates. The touch sensor control circuit 53 acquires the mutual capacitance, based on the detection signal Rx, and detects the touch. Then, the touch sensor control circuit 53 transmits coordinates in which the touch is detected to the controller 2.

Figure 10:
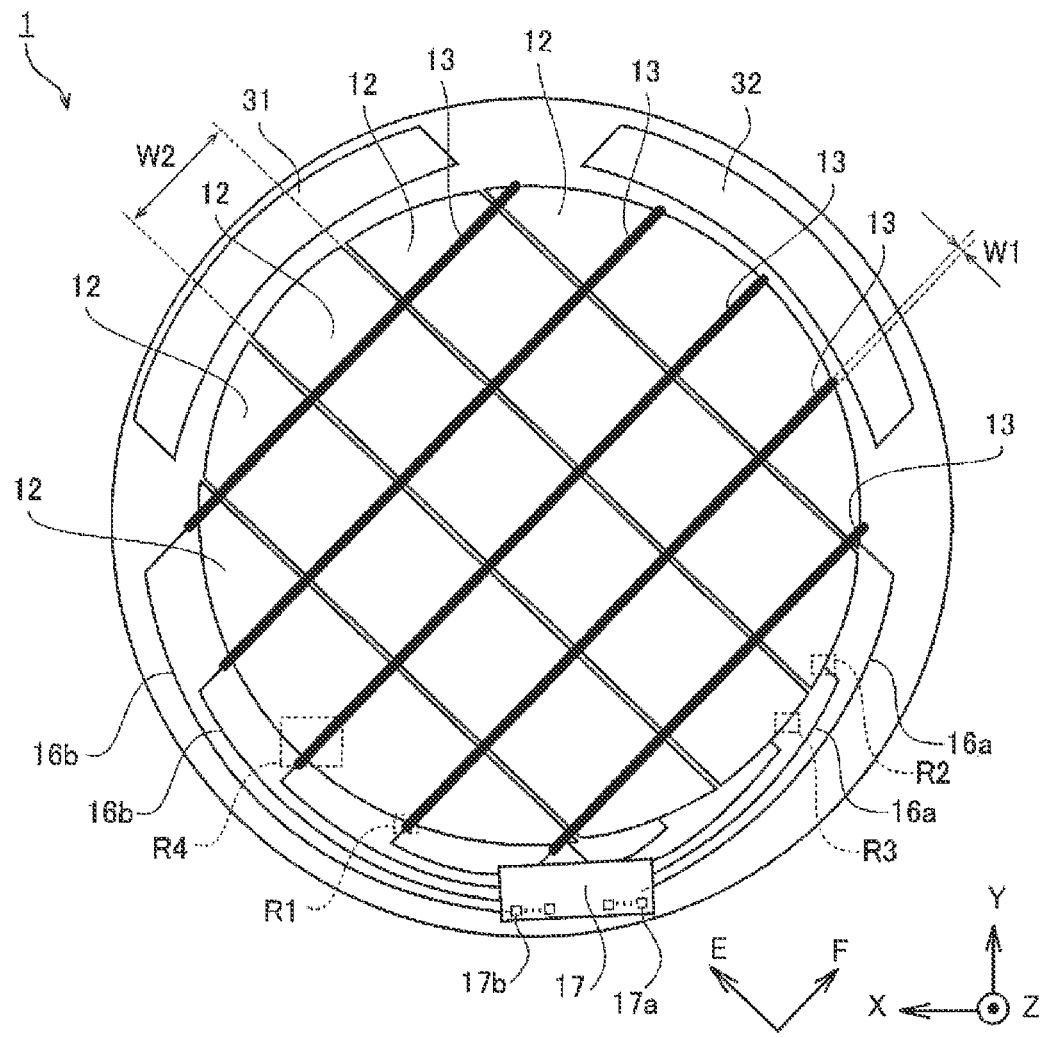
FIG. 10 is a plan view of the touch panel 1 according to the first embodiment.

FIG. 10 is a plan view of the touch panel 1 according to the first embodiment. As illustrated in FIG. 10, in the first embodiment, the touch panel 1 (color filter substrate 10) has a non-rectangular shape in a plan view, and has, for example, a circular shape.

Here, in the first embodiment, a plurality of the transmitter electrodes 12 extend in a direction along an E axis intersecting the X axis and intersecting the Y axis illustrated FIG. 10. The plurality transmitter electrodes 12 are disposed side by side in a direction along an F axis orthogonal to the E axis. An angle formed by the F axis and the X axis is, for example, 45 degrees. A plurality of the receiver electrodes 13 extend in a direction along the F axis. The plurality of receiver electrodes 13 are disposed side by side in a direction along the E axis. In other words, the plurality of receiver electrodes 13 extend in a direction intersecting the direction in which the transmitter electrodes 12 extend.

Furthermore, in the first embodiment, width W1 of each receiver electrode 13 is smaller than a width W2 of each transmitter electrode 12. The width W1 of the receiver electrode 13 is small, and thus a coupling capacitance (load capacity) between the transmitter electrode 12 and the receiver electrode 13 can be reduced. As a result, a decrease of the signal from the receiver electrode 13 due to the coupling capacitance can be prevented.

As illustrated in FIG. 10, the touch panel 1 includes a plurality of transmitter wiring lines 16a each connected to a corresponding one of the plurality of transmitter electrodes 12, a plurality receiver wiring lines 16b each connected to corresponding one of the plurality of receiver electrodes 13, and a terminal portion 17. The transmitter wiring line 16a is connected to an end portion closer to a negative side of the E axis of the transmitter electrode 12. The receiver wiring line 16b is connected to an end portion closer to a negative side of the Y axis of the receiver electrode 13. Furthermore, the terminal portion 17 is disposed on the active matrix substrate 20 closer to the negative side of the Y axis with respect to the plurality of transmitter electrodes 12 and the plurality of receiver electrodes 13. The terminal portion 17 includes a plurality of transmitter terminals 17a each connected to a corresponding one of the plurality of transmitter wiring lines 16a, and a plurality of receiver terminals 17b each connected to a corresponding one of the plurality of receiver wiring lines 16b. The plurality of transmitter wiring lines 16a and the plurality of receiver wiring lines 16b are formed on the active matrix substrate 20 in a portion closer to a negative side of the Y axis of the touch panel 1. The terminal portion 17 is connected to a flexible printed circuit board (not illustrated), and electrically connects the controller 2 to the plurality of transmitter electrodes 12 and the plurality of receiver electrodes 13. The transmitter wiring line 16a, the receiver wiring line 16b, and a signal line 16c described below contain a metal material (for example, aluminum, titanium, copper, or the like).

As illustrated in FIG. 10, a GPS antenna 31 and a communication circuit 32 are disposed in a portion closer to a positive side of the Y axis of the touch panel 1. The controller 2 acquires position information via the GPS antenna 31. The controller 2 wirelessly communicates with another device via the communication circuit 32.

Figure 11A:
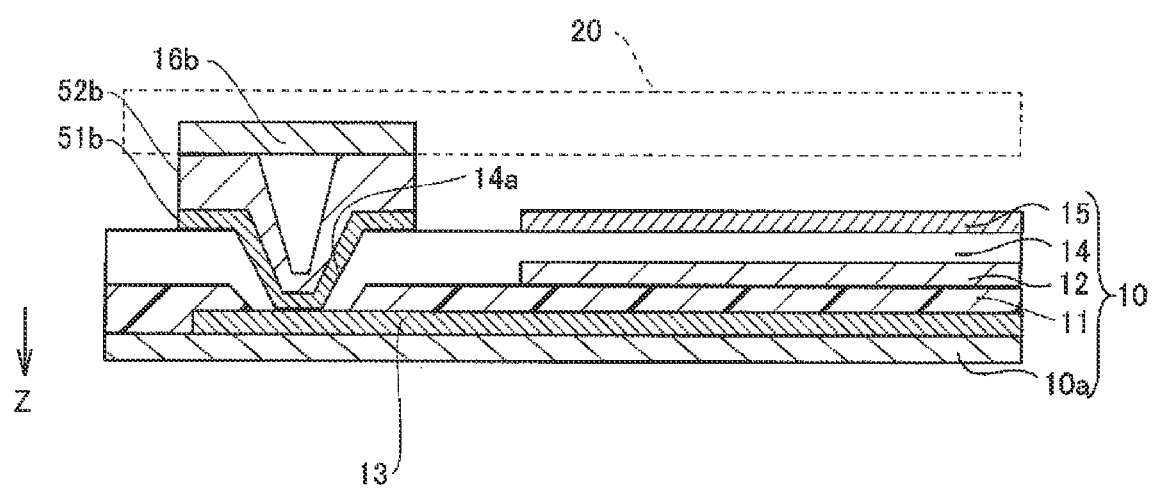
FIG. 11A is a cross-sectional view of a portion of the touch panel 1 for describing a connection between the receiver electrode 13 and a receiver wiring line 16b, and is a cross-sectional view in a region R1 in FIG. 10.
Figure 11B:
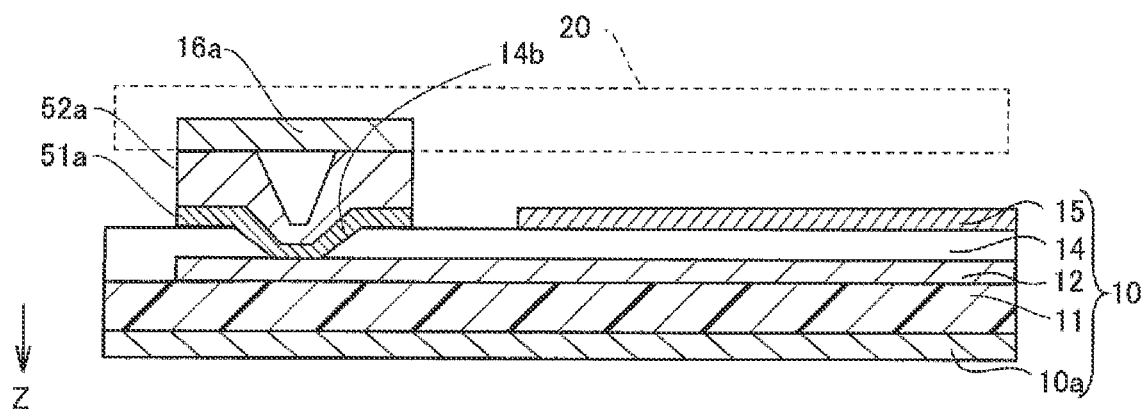
FIG. 11B is a cross-sectional view of a portion of the touch panel 1 for describing a connection between the transmitter electrode 12 and a transmitter wiring line 16a, and is a cross-sectional view in a region R2 in FIG. 10.
Figure 11C:
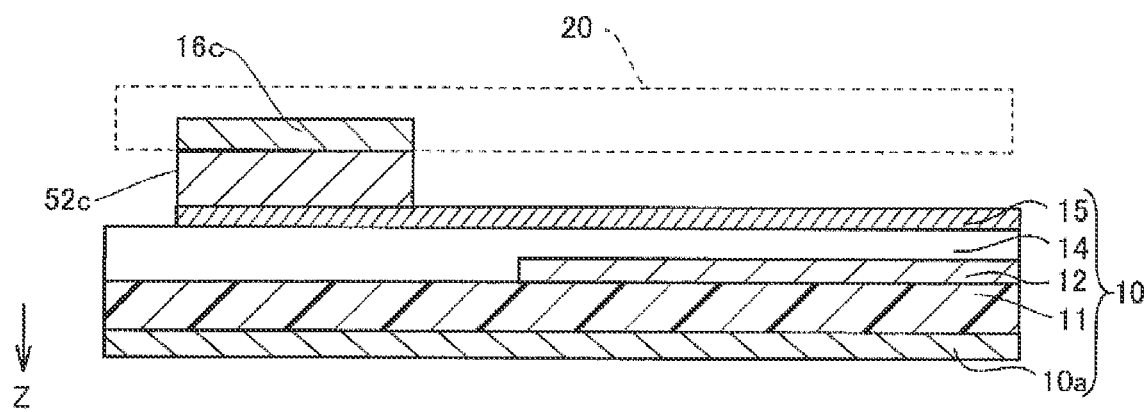
FIG. 11C is a cross-sectional view of a portion of the touch panel for describing a connection between the common electrode 15 and a signal line 16c, and is a cross-sectional view in a region R3 in FIG. 10.

FIG. 11A is a cross-sectional view of a portion of the touch panel 1 for describing a connection between the receiver electrode 13 and the receiver wiring line 16b, and is a cross-sectional view in a region R1 in FIG. 10. FIG. 11B is a cross-sectional view of a portion of the touch panel 1 for describing a connection between the transmitter electrode 12 and the transmitter wiring line 16a, and is a cross-sectional view in a region R2 in FIG. 10. FIG. 11C is a cross-sectional view of a portion of the touch panel 1 for describing a connection between the common electrode 15 and the signal line 16c, and is a cross-sectional view in a region R3 in FIG. 10. As illustrated in FIG. 11A, a contact hole 14a is provided in the overcoat film 14. A conductor 51b and a common transfer material 52b containing a conductive material connected to the receiver wiring line 16b are disposed in the contact hole 14a. The conductor 51b is connected to the receiver electrode 13. As a result, she receiver electrode 13 of the color filter substrate 10 and the receiver wiring line 16b of the active matrix substrate 20 are connected to each other. Furthermore, as illustrated in FIG. 11B, a contact hole 14b is provided in the overcoat film 14. A conductor 51a and a common transfer material 52a containing a conductive material connected to the transmitter wiring line 16a are disposed in the contact hole 14b. The conductor 51a is connected to the transmitter electrode 12. As a result, the transmitter electrode 12 of the color filter substrate 10 and the transmitter wiring line 16a of the active matrix substrate 20 are connected to each other. As illustrated in FIG. 11C, a common transfer material 52c containing a conductive material is disposed on the common electrode 15. As a result, the common electrode 15 of the color filter substrate 10 is connected to the signal line 16c of the active matrix substrate 20 via the common transfer material 52c. The common transfer materials 52a to 52c are formed of, for example, a material in which a resin material having adhesiveness and a conductive material are mixed.

According to the above configuration, wiring line resistance can be reduced by using the transmitter wiring line 16a of a metal, the receiver wiring line 16b of a metal, and the signal line 16c of a metal, each having a smaller resistance value than transparent electrode. As a result, influences of the wiring line resistance on the signal to the transmitter electrode 12 and the signal from the receiver electrode 13 can be reduced. Furthermore, as in the first embodiment, even when the touch sensor control circuit 53 is provided on the active matrix substrate 20, the transmitter electrode 12 or the receiver electrode 13 can be easily connected to the touch sensor control circuit 53, by using the conductors 51a and 51b in the contact holes 14a and 14b, and the transmitter wiring line 16a and the receiver wiring line 16b.

Configuration of Gap Portion

Figure 12:
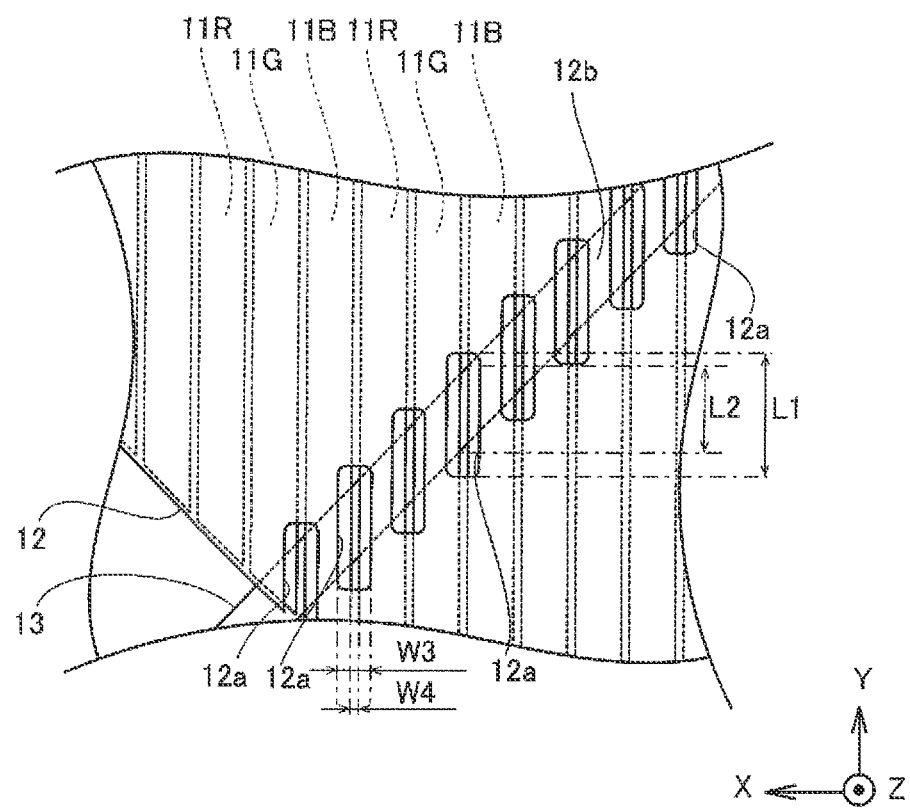
FIG. 12 is a plan view of a portion of the color filter substrate 10 and is a partially enlarged view of a region R4 in FIG. 10.

FIG. 12 is a plan view of a portion of the color filter substrate 10 and is a partially enlarged view of a region R4 in FIG. 10. As illustrated in FIG. 12, the blue color filter 11B, the green color filter 11G, and the red color filter 11R are disposed side by side in the X direction. In the first embodiment, as illustrated in FIGS. 3 and 12, the transmitter electrode 12 includes a gap portion 12a at a position in which the receiver electrode 13 is disposed. As illustrated in FIG. 12, the gap portion 12a is formed as an opening (hole) in a plan view in the first embodiment. The gap portion 12a is provided at a position of the transmitter electrode 12 intersecting the receiver electrode 13. The gap portion 12a is formed in each portion overlapping a corresponding one of a space between the red color filter 11R and the green color filter 11G adjacent to each other, a space between the green color filter 11G and the blue color filter 11B adjacent to each other, and a space between the blue color filter 11B and the red color filter 11R adjacent to each other, in a plan view. Note that, in the first embodiment, the "gap portion 12a" refers to a portion where the transmitter electrode 12 is not provided, and another member (for example, a portion of the overcoat film 14) may be disposed in the gap portion 12a.

As illustrated in FIG. 12, the gap portion 12a is formed, for example, in a rectangular shape in a plan view. A width W3 along the X axis of the gap port on 12a is larger than a gap W4 between adjacent ones of the plurality of color filters 11. A length L1 along the Y axis of the gap portion 12a is longer than a length L2 along the Y axis of the receiver electrode 13 disposed between adjacent ones of the plurality of color filters 11. Thus, the transmitter electrode 12 and the receiver electrode 13 can be more reliably prevented from being short-circuited.

Furthermore, the transmitter electrode 12 includes a conductor portion 12b between adjacent ones of a plurality of the gap portions 12a. Portions closer to a positive side and a negative side of the Y-axis of the transmitter electrode 12 with respect to the receiver electrode 13 are connected to each other by the conductor portion 12b.

According to the configuration described above, even when the transmitter electrode 12 and the receiver electrode 13 are formed on the first substrate 10a on which the color filter 11 is formed, the transmitter electrode 12 and the receiver electrode 13 can be prevented from being short-circuited by the gap portion 12a.

First Modified Example of First Embodiment

Figure 13:
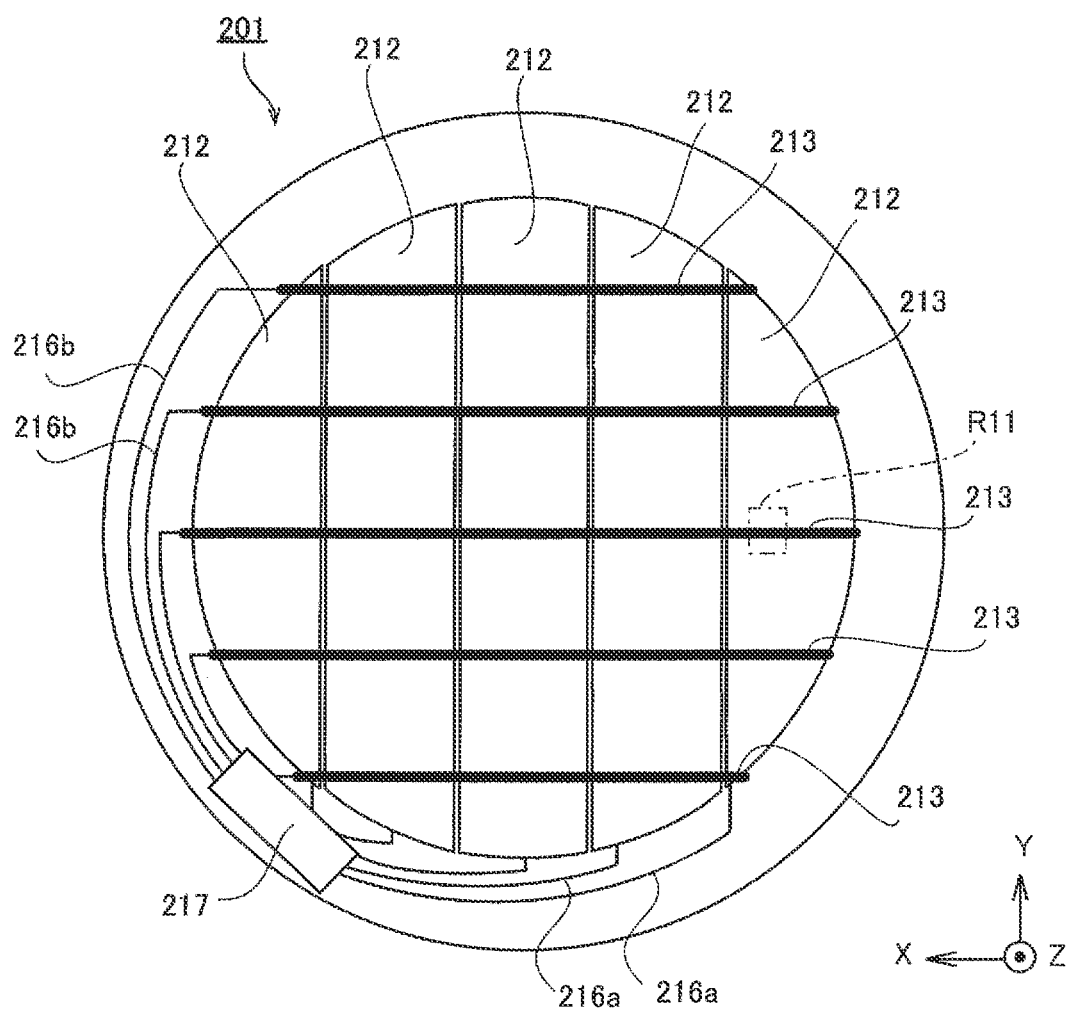
FIG. 13 is a plan view of a touch panel 201.
Figure 14:
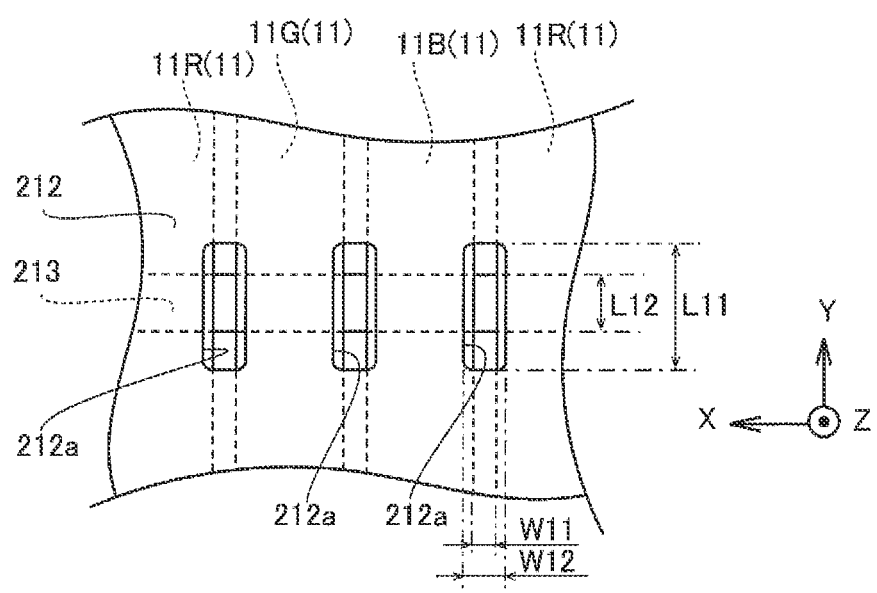
FIG. 14 is a view for describing a configuration of a gap portion 212a, and is a partially enlarged view of a region R12 in FIG. 13.

Next, a configuration of a touch panel 201 according to a first modified example of the first embodiment will be described with reference to FIGS. 13 and 14. FIG. 13 is a plan view of the touch panel 201. FIG. 14 is a view for describing a configuration of a gap portion 212a, and is a partially enlarged view of a region R11 in FIG. 13.

As illustrated in FIG. 13, the touch panel 201 includes a plurality of transmitter electrodes 212 extending in a direction along the Y axis, and a plurality of receiver electrodes 213 extending, in a direction along the X axis. The plurality of transmitter electrodes 212 are disposed side by side in a direction along the X axis. The plurality of receiver electrodes 213 are disposed side by side in a direction along the Y axis. The touch panel 201 includes a terminal portion 217, a plurality of transmitter wiring lines 216a, and a plurality of receiver wiring lines 216b. The transmitter wiring line 216a is connected to an end portion closer to the negative side of the Y axis of the transmitter electrode 212 and is connected to the terminal portion 217. The receiver wiring line 216b is connected to an end portion closer to the positive side of the X axis of the receiver electrode 213 and is connected to the terminal portion 217.

As illustrated in FIG. 14, the blue color filter 11B, the green color filter 11G, and the red color filter 11R are disposed side by side in the X direction. In the first modified example of the first embodiment, the transmitter electrode 212 includes the gap portion 212a in each portion overlapping a corresponding one of a space between the red color filter 11R and the green color filter 11G adjacent to each other, a space between the green color filter 11G and the blue color filter 11B adjacent to each other, and a space between the blue color filter 11B and the red color filter 11R adjacent to each other, in a plan view. The gap portion 212a is formed, for example, in a rectangular shape in a plan view. A width W12 along the X axis of the gap portion 212a is larger than a gap W11 between adjacent ones of the plurality of color filters 11. A length L11 along the Y axis of the gap portion 212a is longer than a length L12 along the Y axis of the receiver electrode 213.

Also in the first modified example of the first embodiment, the transmitter electrode 212 and the receiver electrode 213 can be prevented from being short-circuited by the gap portion 212a. Note that other configurations and effects are similar to those in the first embodiment.

Second Modified Example of First Embodiment

Figure 15:
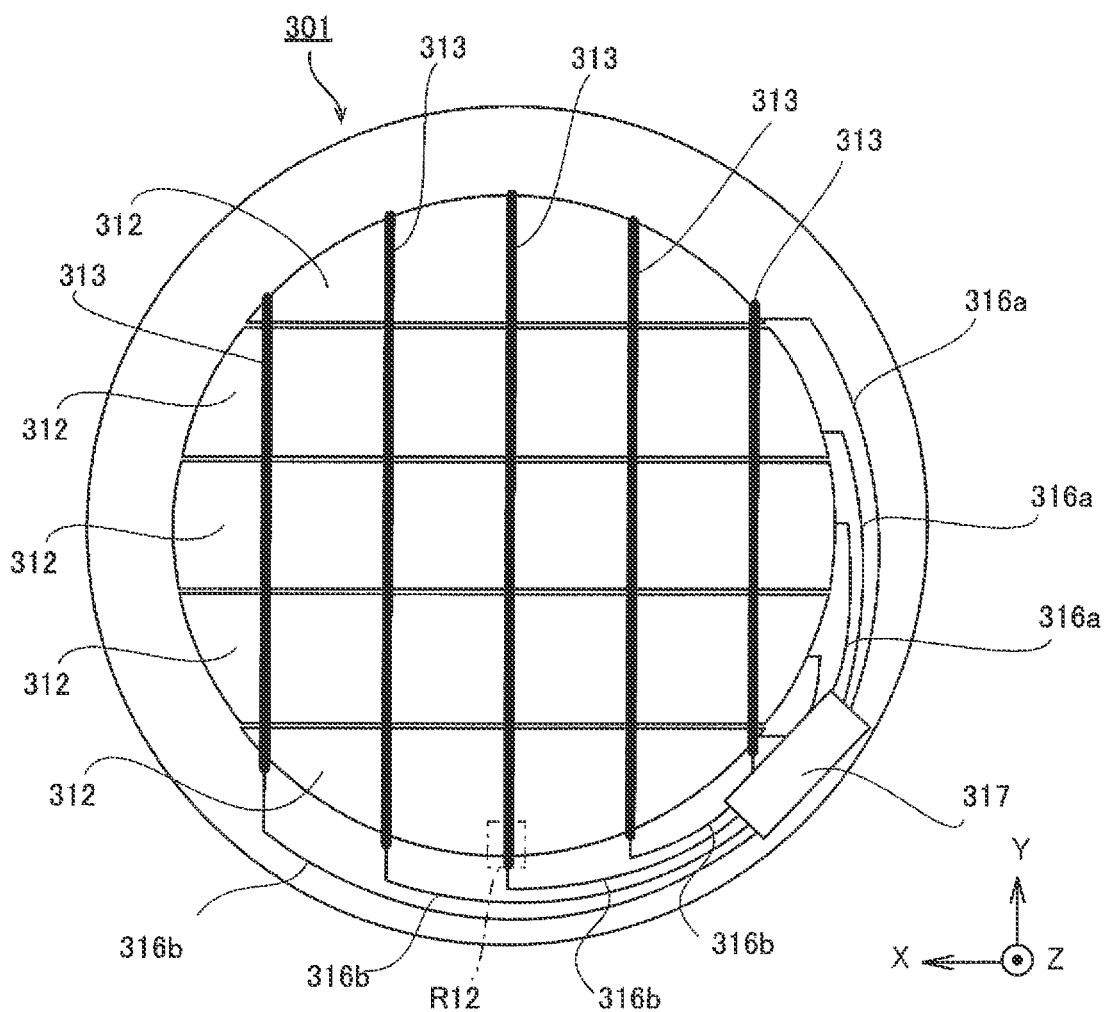
FIG. 15 is a plan view of a touch panel 301.
Figure 16:
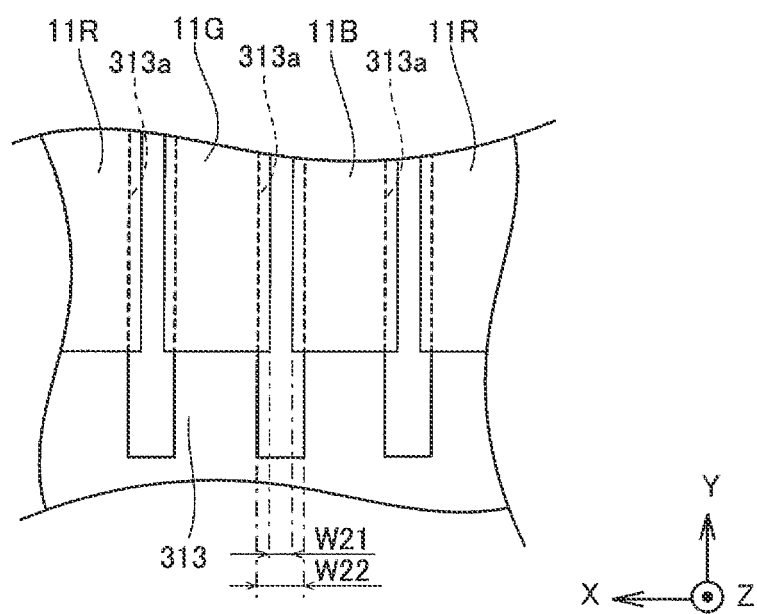
FIG. 16 is a view for describing a configuration of a gap portion 313a, and is a partially enlarged view of a region R12 in FIG. 15.
Figure 17:
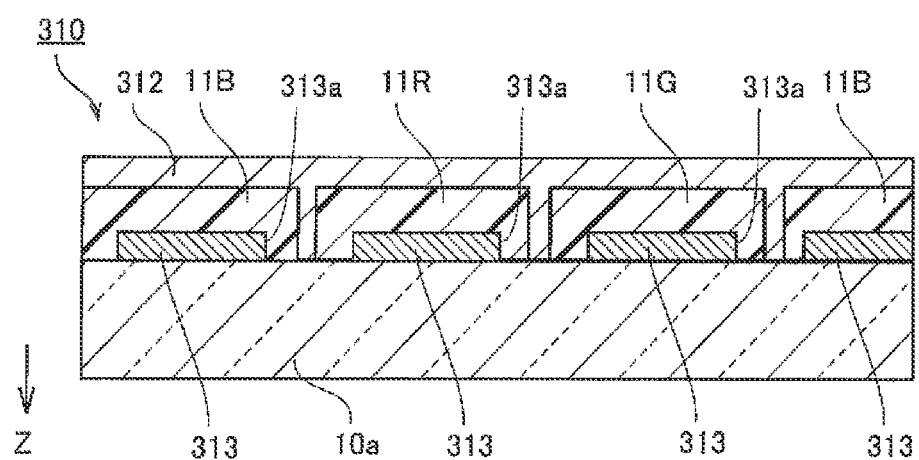
FIG. 17 is a cross-sectional view of a portion of a color filter substrate 310.

Next, a configuration of a touch panel 301 according to a second modified example of the first embodiment will be described with reference to FIGS. 15 to 17. FIG. 15 is a plan view of a touch panel 301. FIG. 16 is a view for describing a configuration of a gap portion 313a, and is a partially enlarged view of a region R12 in FIG. 15. The touch panel 301 includes a color filter substrate 310. FIG. 17 is a cross-sectional view of a portion of the color filter substrate 310.

As illustrated in FIG. 15, the touch panel 301 includes a plurality of transmitter electrodes 312 extending in a direction along the X axis, and a plurality of receiver electrodes 313 extending in a direction along the Y axis. The plurality of transmitter electrodes 312 are disposed side by side in a direction along the Y axis. The plurality of receiver electrodes 313 are disposed side by side in a direction along the X axis. The touch panel 301 includes a terminal portion 317, a plurality of transmitter wiring lines 316a, and a plurality of receiver wiring lines 316b. The transmitter wiring line 316a is connected to an end portion closer to the negative side of the X axis of the transmitter electrode 312 and is connected to the to portion 317. The receiver line 316b is connected to an end portion closer to the negative side of the Y axis of the receiver electrode 313 and is connected to the terminal portion 317.

As illustrated in FIG. 16, the blue color filter 11B, the green color filter 11G, and the red color filter 11R are disposed side by side in the X direction. In the second modified example of the first embodiment, the receiver electrode 313 includes the gap port on 313a in each portion overlapping a corresponding one of a space between the red color filter 11R and the green color filter 11G adjacent to each other, a space between the green color filter 11G and the blue color filter 11B adjacent to each other, and a space between the blue color filter 11B and the red color filter 11R adjacent to each other, in a plan view. A portion separated by the gap portion 313a is connected closer to the negative side of the Y axis with respect to the color filter 11 of the receiver electrode 313. In other words, the gap portion 313a is provided in the receiver electrode 313, and thus the receiver electrode 313 is formed in a comb shape in a plan view. A width W22 along the X axis of the gap portion 313a is larger than a gap W21 between adjacent ones of the plurality of color filters 11.

As shown in FIG. 17, the transmitter electrode 312 is formed in each of a space between the red color filter 11R and the green color filter 11G adjacent to each other, a space between the green color filter 11G and the blue color filter 11B adjacent to each other, and a space between the blue color filter 11B and the red color filter 11R adjacent to each other. Furthermore, each of the blue color filter 11B, the green color filter 11G, and the red color filter 11R is formed so as to overlap the receiver electrode 313. Thus, also in the second modified example of the first embodiment, the transmitter electrode 312 and the receiver electrode 313 can be prevented from being short-circuited by the gap portion 313a. Note that other configurations and effects are similar to those in the first embodiment.

Second Embodiment

Figure 18:
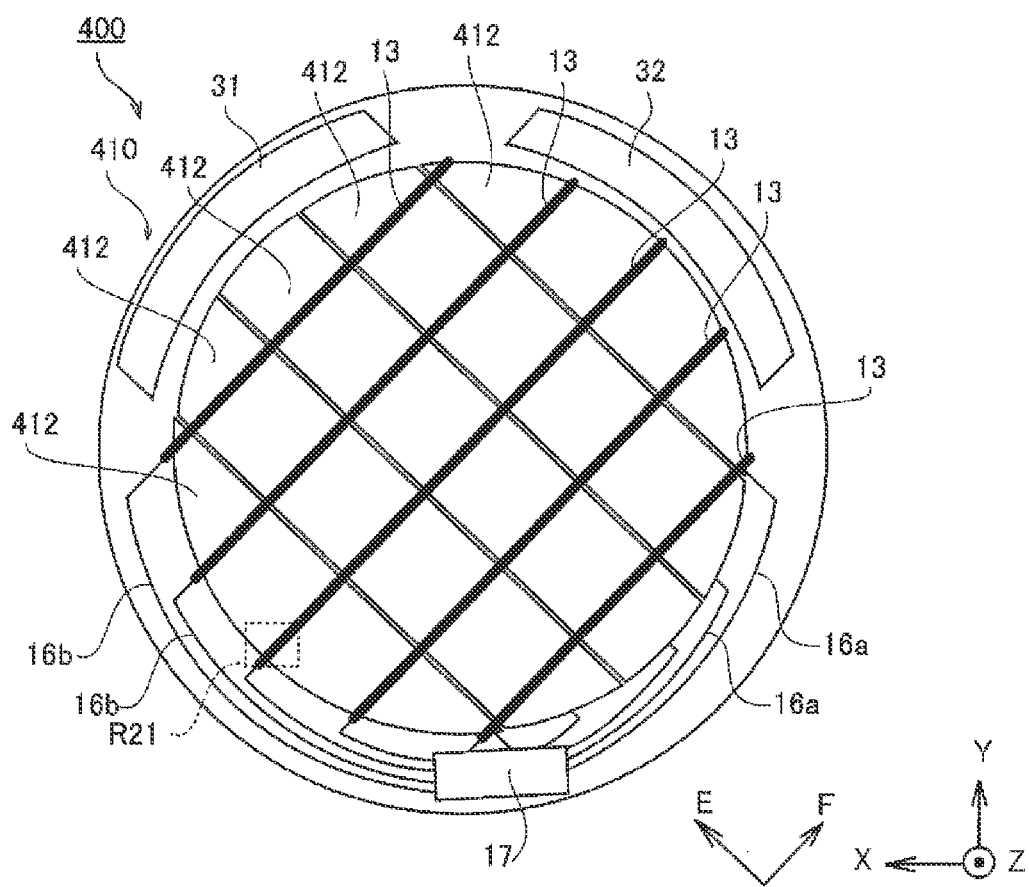
FIG. 18 is a plan view of an in-cell touch panel device 400 according to a second embodiment.
Figure 19:
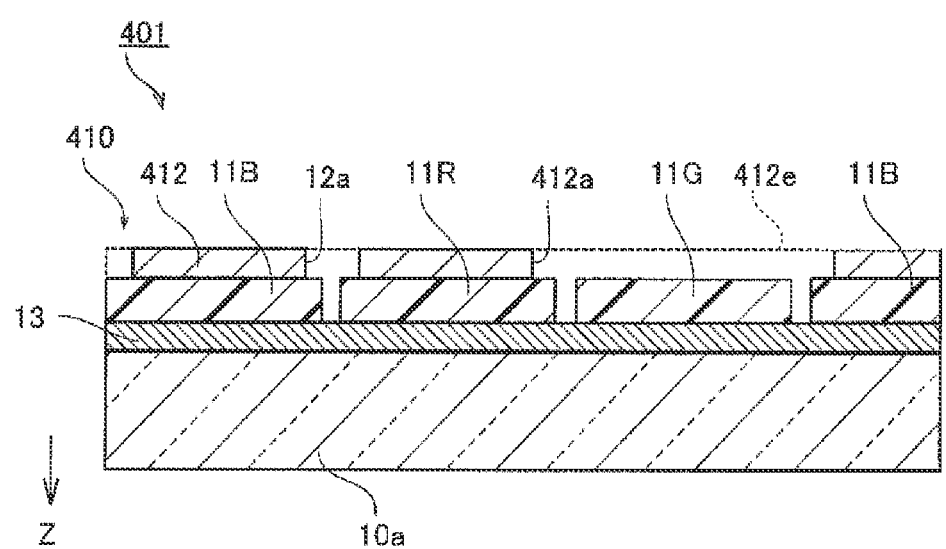
FIG. 19 is a cross-sectional view of a portion where the receiver electrode 13 of a color filter substrate 410 according to the second embodiment is disposed.
Figure 20:
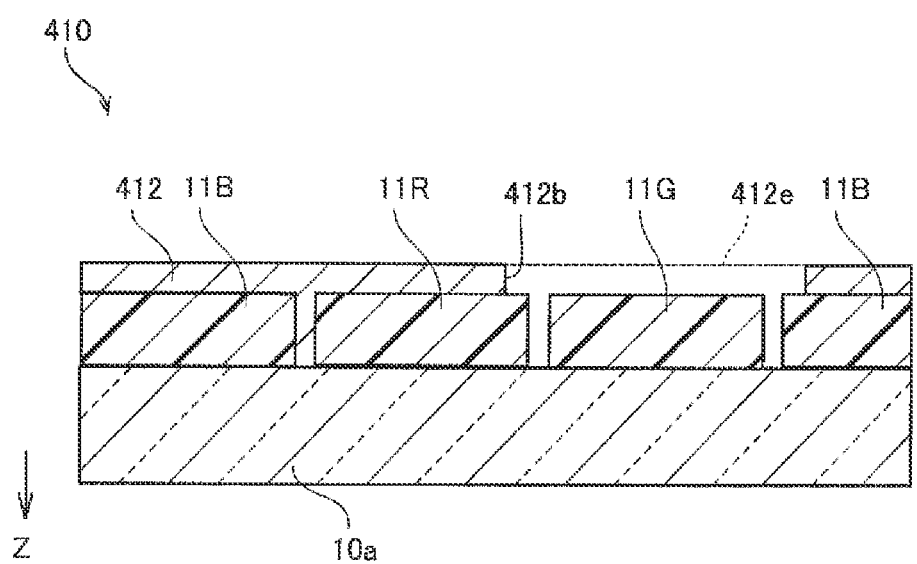
FIG. 20 is a cross-sectional view of a portion where the receiver electrode 13 of the color filter substrate 410 according to the second embodiment is not disposed.
Figure 21:
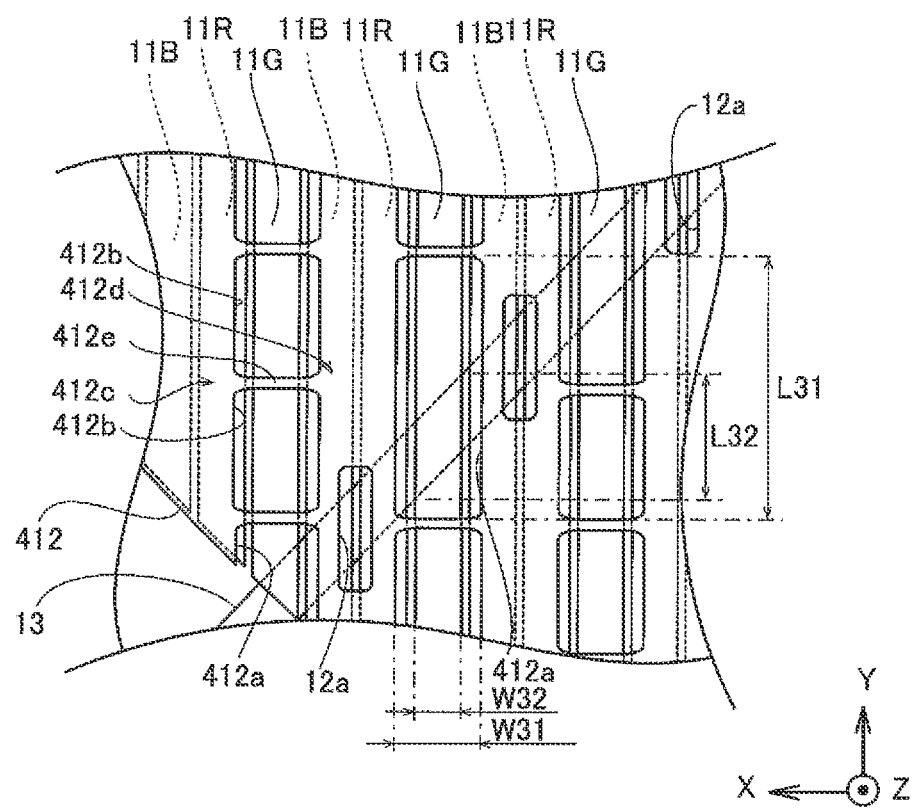
FIG. 21 is a view for describing a gap portion 412b according to the second embodiment.

Next, a configuration of an in-cell touch panel device 400 of a second embodiment will be described with reference to FIGS. 18 to 21. In the second embodiment, a gap portion 412a is formed on the green color filter 11G. FIG. 18 is a plan view of an in-cell touch panel device 400 according to the second embodiment. FIG. 19 is a cross-sectional view of a portion where the receiver electrode 13 of a color filter substrate 410 according to the second embodiment is disposed. FIG. 20 is a cross-sectional view of a portion where the receiver electrode 13 of the color filter substrate 410 according to the second embodiment is not disposed. FIG. 21 is a view for describing a gap portion 412b according to the second embodiment. Note that, in the following description when the same reference numerals as those in the first embodiment are used, similar configurations to those in the first embodiment are indicated, and reference is made to the preceding description unless otherwise described.

As illustrated in FIGS. 18 and 19, the in-cell touch panel device 400 according to the second embodiment includes a touch panel 401 including the color filter substrate 410. As illustrated in FIG. 18, the color filter substrate 410 includes transmitter electrodes 412 and receiver electrodes 13. The transmitter electrode 412 is formed to extend along the E axis. A plurality of the transmitter electrodes 412 are disposed side by side along the F axis.

As illustrated in FIG. 19, the transmitter electrode 412 includes a gap portion 412a. At a position on the color filter substrate 410 where the receiver electrode 13 is disposed, the gap portion 412a is formed from a portion overlapping a space between the green color filter 11G and the blue color filter 11B in a plan view to a portion overlapping the green color filter 11G in a plan view and a portion overlapping a space between the green color filter 11G and the red color filter 11R in a plan view. As a result, at the position on the color filter substrate 410 where the receiver electrode 13 is disposed, the transmitter electrode 412 is not formed on the green color filter 11G.

As illustrated in FIGS. 20 and 21, the transmitter electrode 412 includes a gap portion 412b. At a position on the color filter substrate 410 where the receiver electrode 13 is not disposed, the gap portion 412b is formed from a portion overlapping a space between the green color filter 11G and the blue color filter 11B in a plan view to a portion overlapping the green color filter 11G in a plan view and a portion overlapping a space between the green color filter 11G and the red color filter 11R in a plan view. As a result, even at the position on the color filter substrate 410 where the receiver electrode 13 is not disposed, the transmitter electrode 412 is not formed in a portion of the green color filter 11G.

As illustrated in FIG. 21, the transmitter electrode 412 includes a connection portion 412e for connecting a portion 412c on the red color filter 11R and a portion 412d on the blue color filter 11B. The connection portion 412e is formed at a position on the color filter substrate 410 where the receiver electrode 13 is not disposed. Furthermore, the gap portion 412b is formed for each pixel 60 (see FIG. 7) along the Y axis on the green color filter 11G. The connection portion 412e is also formed between the two gap portions 412b adjacent to each other in the Y direction. The connection portion 412e is formed at, for example, a position overlapping a boundary portion of the pixels 60 adjacent to each other in the Y direction.

Furthermore, as illustrated in FIG. 21, a width W31 in a direction along the X axis of the gap portion 412a is longer than a width W32 of the green color filter 11G. A length L31 in a direction along the Y axis of the gap portion 412a is longer than a length L32 along the Y direction in a portion where the green color filter 11G and the receiver electrode 13 overlap each other. Furthermore, in the transmitter electrode 412, the gap portion 12a is provided in a portion overlapping a space between the red color filter 11R and the blue color filter 11B in a portion overlapping the receiver electrode 13.

Here, in a reflection type display including the reflector, light needs to transmit through the transmitter electrode and the receiver electrode twice when being incident and reflected, and thus a loss of light (absorption or scatter) increases as compared with that of the transmission type. Furthermore, among green, red, and blue, green has the highest luminosity factor. In contrast, according to the configuration of the second embodiment described above, since a portion of the transmitter electrode 412 is not provided at a position overlapping the green color filter 11G whose brightness and darkness are easily perceived by the humans, even when the transmitter electrode 412 and the receiver electrode 13 are provided, the influence of the loss of light can be reduced. Note that other configurations and effects of the second embodiment are similar to the configurations and effects of the first embodiment.

First Modified Example of Second Embodiment

Figure 22:
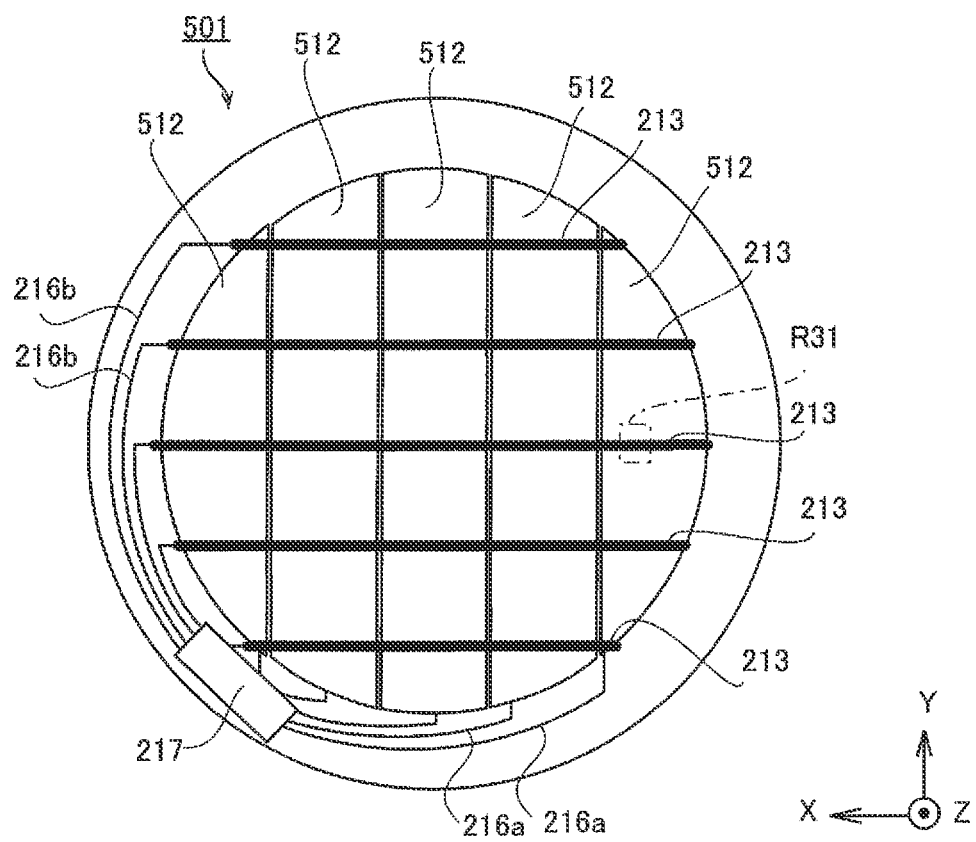
FIG. 22 is a plan view of a touch panel 501 according to a first modified example of the second embodiment.
Figure 23:
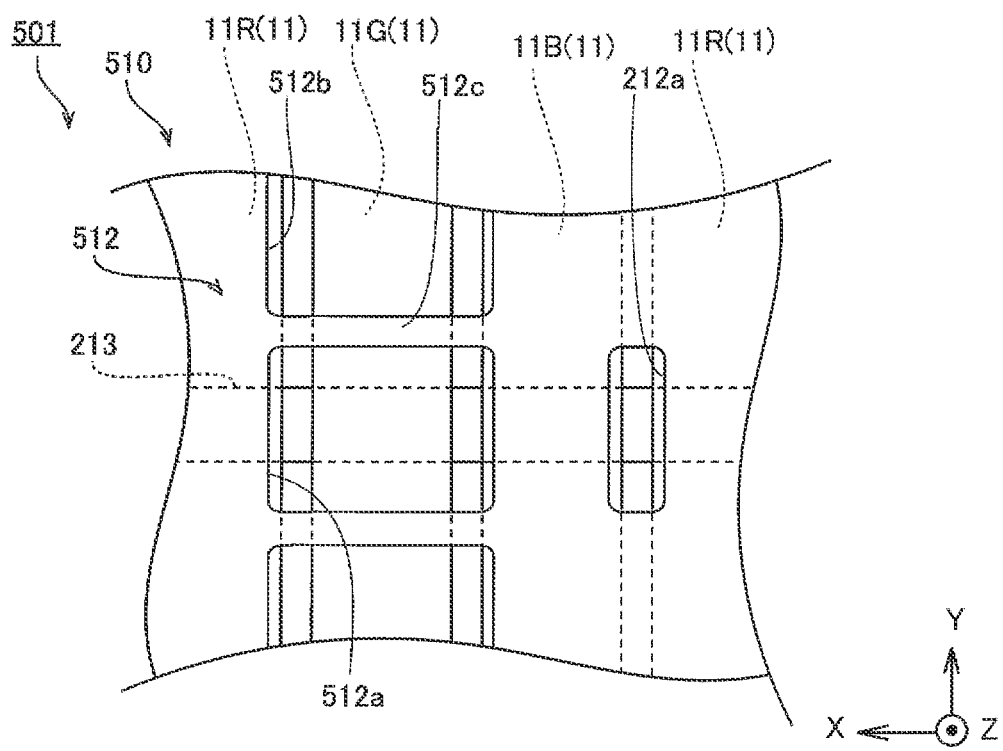
FIG. 23 is a plan view of a portion of the touch panel 501, and is a partially enlarged view of a region R31 in FIG. 22.

Next, a configuration of a touch panel 501 according to a first modified example of the second embodiment will be described with reference to FIGS. 22 and 23. FIG. 22 is a plan view of the touch panel 501 according to the first modified example of the second embodiment. FIG. 23 is a plan view of a portion of the touch panel 501, and is a partially enlarged view of a region R31 in FIG. 22. The touch panel 501 includes a color filter substrate 510. Note that, in the following description, when the same reference numerals as those in the first modified example of the first embodiment are used, similar configurations to those in the first modified example of the first embodiment are indicated, and reference is made to the preceding description unless otherwise described.

As illustrated in FIG. 22, the touch panel 501 includes a plurality of transmitter electrodes 512 extending in a direction along the Y axis. The plurality of transmitter electrodes 512 are disposed side by side in a direction along the X axis.

As illustrated in FIG. 23, in the first modified example of the second embodiment, the transmitter electrode 512 includes gap portions 512a and 512b. At a position on the color filter substrate 510 where the receiver electrode 213 is disposed, the gap portion 512a is formed from a portion overlapping a space between the green color filter 11G and the blue color filter 11B in a plan view to a portion overlapping the green color filter 11G in a plan view and a portion overlapping a space between the green color filter 11G and the red color filter 11R in a plan view. Furthermore, at a position on the color filter substrate 510 where the receiver electrode 13 is not disposed, the gap portion 512b is formed from a portion overlapping a space between the green color filter 11G and the blue color filter 11B in a plan view to a portion overlapping the green color filter 11G a plan view and a portion overlapping a space between the green color filter 11G and the red color filter 11R in a plan view. Furthermore, the transmitter electrode 512 includes a connection portion 512c for connecting a portion closer to the positive side of the X axis with respect to the green color filter 11G to a portion closer to the negative side of the X axis with respect to the green color filter 11G. Furthermore, the gap portion 512b is formed for each pixel 60 (see FIG. 7) along the Y axis on the green color filter 11G. The connection portion 512c is also formed between the two gap portions 512b adjacent to each other in the Y direction. The connection portion 512c is formed at, for example, a position overlapping a boundary portion of the pixels 60 adjacent to each other in the Y direction. Note that other configurations and effects are similar to those in the first modified example of the first embodiment.

Second Modified Example of Second Embodiment

Figure 24:
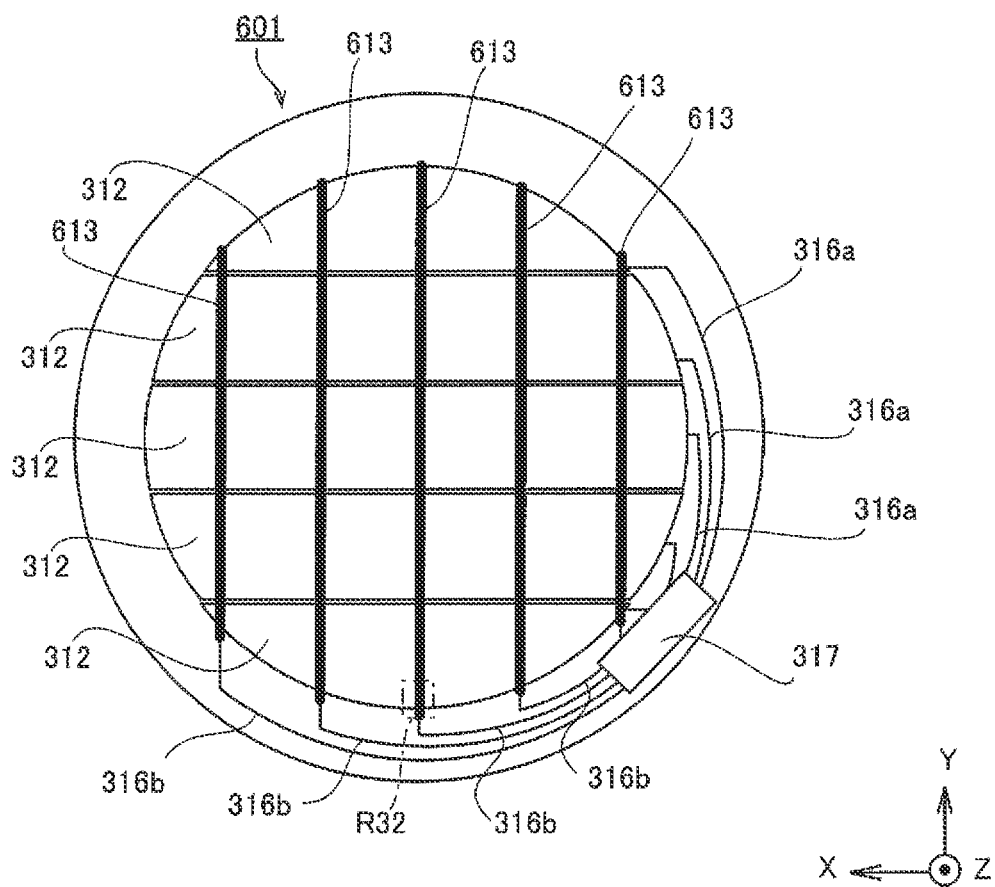
FIG. 24 is a plan view of a touch panel 601.
Figure 25:
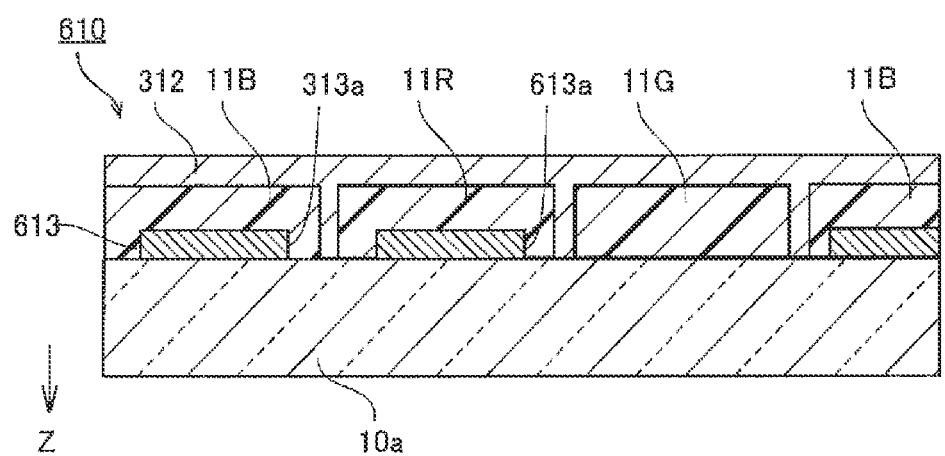
FIG. 25 is a view for describing a configuration of a gap portion 613a, and is a partially enlarged view of a region R32 in FIG. 24.
Figure 26:
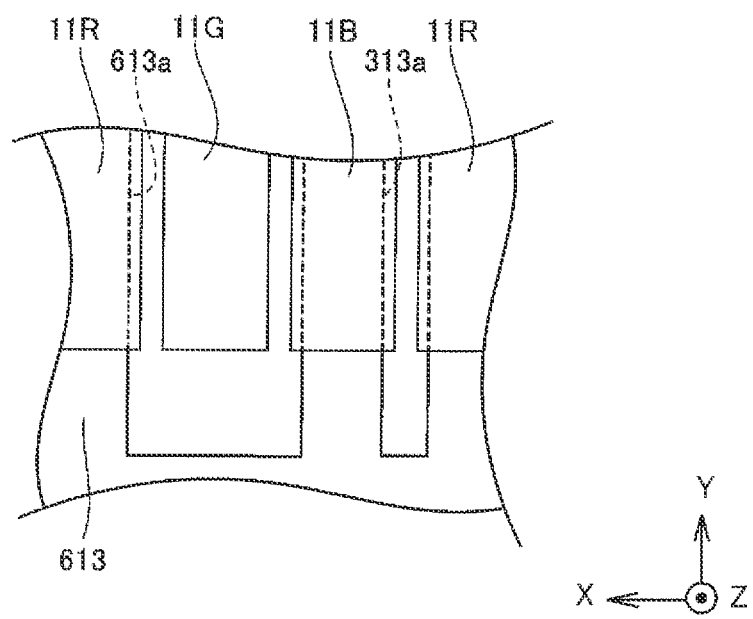
FIG. 26 is a cross-sectional view of a portion of the color filter substrate 310.

Next, configuration of a touch panel 601 of a second modified example of the second embodiment will be described with reference to FIGS. 24 to 26. FIG. 24 is a plan view of the touch panel 601. FIG. 25 is a view for describing a configuration of a gap portion 613a, and is a partially enlarged view of a region R32 in FIG. 24. The touch panel 601 includes a color filter substrate 610. FIG. 26 is a cross-sectional view of a portion of the color filter substrate 310.

As illustrated in FIG. 24, the touch panel 601 includes a plurality of receiver electrodes 613 extending in a direction along the Y axis. The plurality of receiver electrodes 613 are disposed side by side in a direction along the X axis.

As illustrated in FIG. 25, in the second modified example of the second embodiment, the receiver electrodes 613 includes a gap portion 613a. The gap portion 613a is formed from a portion overlapping a space between the green color filter 11G and the blue color filter 11B in a plan view to a portion overlapping the green color filter 11G in a plan view and a portion overlapping a space between the green color filter 11G and the red color filter 11R in a plan view.

As illustrated in FIG. 26, portions closer to the positive side and the negative side of the X axis with respect to the green color filter 11G of the receiver electrode 613 are connected to each other closer to the negative side of the Y axis with respect to the green color filter 11G. Note that other configurations and effects are similar to those in the second modified example of the first embodiment.

Third Embodiment

Figure 27:
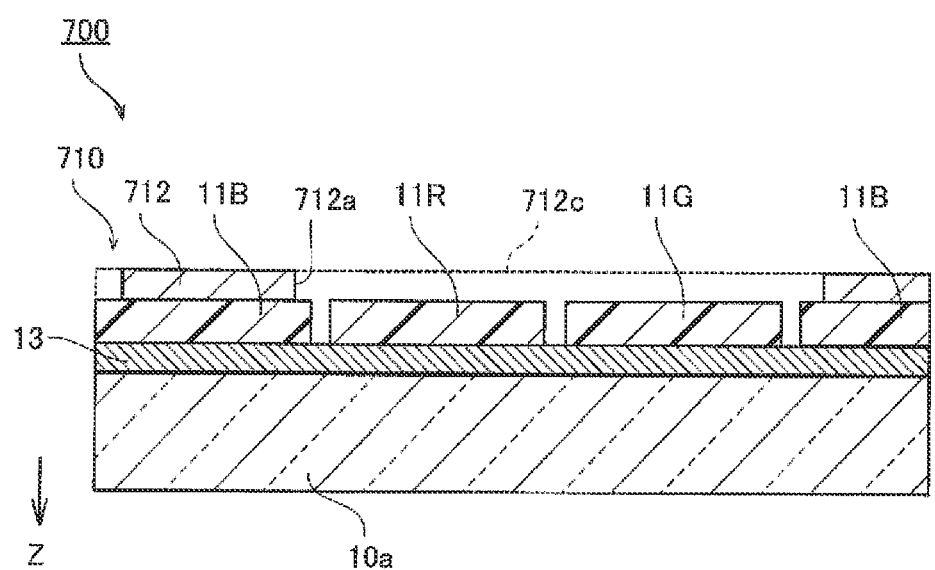
FIG. 27 is a cross-sectional view of a portion where the receiver electrode 13 of a color filter substrate 710 according to a third embodiment is disposed.

Next, a configuration of an in-cell touch and device 700 of a third embodiment will be described with reference to FIG. 27. In the third embodiment, the gap portion 712a is formed on the green color filter 11G and the red color filter 11R. FIG. 27 is a cross-sectional view of a portion where the receiver electrode 13 of a color filter substrate 710 according to the third embodiment is disposed. As illustrated in FIG. 27, in the in-cell touch panel device 700 according to the third embodiment, at a position on the color filter substrate 710 where the receiver electrode 13 is disposed, the gap portion 712a of the transmitter electrode 712 is formed, from a portion overlapping a space between the green color filter 11G and the blue color filter 11B in a plan view to a portion overlapping the green color filter 11G in a plan view, a portion overlapping the red color filter 11R in a plan view, and a portion overlapping a space between the red color filter 11R and the blue color filter 11B in a plan view. The transmitter electrode 712 is provided with a connection portion 712c for connecting a portion disposed on the plurality of blue color filters 11B at a position on the color filter substrate 710 where the receiver electrode 13 is not disposed.

According to the configuration of the third embodiment described above, since green and red have higher luminosity factor than that of blue, the gap portions 712a and 712b of the transmitter electrode 712 are formed on the color filter 11 having high luminosity factor, and thus the influence of the loss of light can be further reduced. Note that other configurations and effects of the third embodiment are similar to the configurations and effects of the first embodiment.

Modifications and the Like

The above-described embodiments are merely examples for carrying out the disclosure. Accordingly, the disclosure is not limited to the embodiments described above and can be implemented by modifying the embodiments described above as appropriate without departing from the scope of the disclosure.

Figure 28:
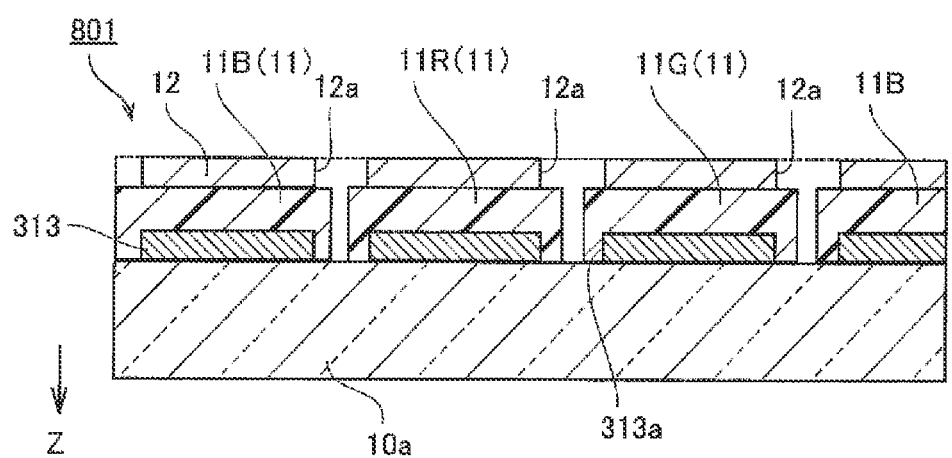
FIG. 28 is a cross-sectional view of a touch panel 801 according to a modified example of the first to third embodiments.

(1) In the first to third embodiments described above, the examples are illustrated in which the gap portion is provided in the transmitter electrode, or the gap portion is provided in the receiver electrode, but the disclosure is not limited to this example. As in a touch panel 801 according to a modified example of the first to third embodiments illustrated in FIG. 28, the gap portion 12a may be provided in the transmitter electrode 12, and the gap portion 313a may be provided in the receiver electrode 313.

(2) In the first to third embodiments described above, the examples are illustrated in which the transmitter electrode is disposed on the upper layer of the color filter (the layer on the opposite side of the touch surface), and the receiver electrode is disposed on the lower layer of the color filter (the layer closer to the touch surface side), but the disclosure is not limited to this example. In other words, the transmitter electrode may be disposed on the lower layer of the color filter (the layer closer to the touch surface side), and the receiver electrode may be disposed on the upper layer of the color filter (the layer on the opposite side of the touch surface).

(3) In the first to third embodiments described above, the examples are illustrated in which the angle formed by the direction in which the transmitter electrode or the receiver electrode extends and the direction in which the color filters are aligned is 45 degrees, 0 degrees, or 90 degrees, but the disclosure is not limited to this example. In other words, the angle formed by the direction in which the transmitter electrode or the receiver electrode extends and the direction in which the color filters are aligned may be configured to be greater than 0 degrees and smaller than 90 degrees.

(4) In the first to third embodiments described above, the examples are illustrated in which the width of the receiver electrode is smaller than the width of the transmitter electrode, but the disclosure is not limited to this example. In other words, the width of the receiver electrode may be equal to the width of the transmitter electrode or more.

(5) In the first to third embodiments described above, the examples are illustrated in which the transmitter wiring line and the receiver wiring line are formed on the active matrix substrate, but the disclosure is not limited to this example. In other words, the transmitter wiring line and the receiver wiring line may be formed on the color filter substrate.

(6) In the first to third embodiments described above, the examples are illustrated in which the gap portion is formed in the rectangular shape in a plan view, but the disclosure is not limited to this example. In other words, the gap portion may be formed in a circular shape, an elliptical shape, or a polygonal shape in a plan view.

(7) In the first to third embodiments described above, the examples are illustrated in which the memory circuit is provided in the pixel, but the disclosure is not limited to this example. In other words, the memory circuit need not necessarily be provided in the pixel.

(8) In the first to third embodiments described above, the examples are illustrated in which both of the reflector and the backlight are provided in the touch panel, but the disclosure is not limited to this example. In other words, one of the reflector and the backlight need not necessarily be provided in the touch panel.

(9) In the first to third embodiments described above, the examples are illustrated in which the drive signal is supplied to the transmitter electrode within the period in which the data is written into the memory circuit, but the disclosure is not limited to this example. In other words, the period in which the data is written into the memory circuit and the period in which the drive signal is supplied to the transmitter electrode may be time-divided.

(10) In the first to third embodiments described above, examples are illustrated in which each of the number of the transmitter electrodes and the number of the receiver electrodes is five, but the disclosure is not limited to this example. Each of the number of the transmitter electrodes and the number of the receiver electrodes may be four or less, or six or more.

(11) In the first to third embodiments described above, the examples are illustrated in which the touch panel has the circular shape in a plan view, but the disclosure is not limited to this example. In other words, the touch panel is not limited to having the circular shape in a plan view, and may have a rectangular shape in a plan view, or may have a polygonal shape in a plan view, or may have an elliptical shape in a plan view.

The in-cell touch panel described above can be described as follows.

An in-cell touch panel according to a first configuration includes a first substrate, a plurality of color filters formed on a layer on an opposite side of a touch surface with respect to the first substrate, a transmitter electrode formed on one of a layer on an opposite side of the touch surface with respect to the plurality of color filters and a layer closer to the touch surface side with respect to the plurality of color filters, a receiver electrode formed on the other of the layer on the opposite side of the touch surface with respect to the plurality of color filters and the layer closer to the touch surface side with respect to the plurality of color filters, and a second substrate disposed to face the first substrate, a pixel electrode being disposed on the second substrate, wherein at least one of the transmitter electrode and the receiver electrode includes a gap portion formed in a portion overlapping a space between adjacent ones of the plurality or color filters in a plan view (first configuration).

According to the first configuration described above, even when the transmitter electrode and the receiver electrode are formed on the first substrate or which the color filters are formed, the transmitter electrode and the receiver electrode are not in contact with each other by the gap portion, and thus the transmitter electrode and the receiver electrode can be prevented from being short-circuited.

In the first configuration, the in-cell touch panel may further include an overcoat film formed on a layer on an opposite side of the touch surface with respect to the plurality of color filters, and a common electrode formed or a layer on an opposite side of the touch surface with respect to the overcoat film, wherein the transmitter electrode may be formed on a layer on an opposite side of the touch surface with respect to the plurality of color filters and closer to the touch surface with respect to the overcoat film, and the receiver electrode may be formed on a layer closer to the touch surface side with respect to the plurality of color filters (second configuration).

Here, the vertical alignment (VA) type is known in which a common electrode is formed on a first substrate on which a color filter is formed, and an electrical field is generated between the common electrode and a pixel electrode formed on a layer on an opposite side of the touch surface with respect to the second substrate, and thus a display is driven. In this case, in a case where at least one of the transmitter electrode or the receiver electrode is formed closer to the second substrate side (layer on the opposite side or the touch surface) with respect to the common electrode, the electrical field formed between the transmitter electrode or the receiver electrode formed on the layer on the opposite side of the touch surface and the pointer is shielded by the common electrode. In contrast, according to the second configuration described above, the common electrode is formed on the layer on the opposite side of the touch surface with respect to the transmitter electrode and the receiver electrode, and thus the electrical field formed between the transmitter electrode or the receiver electrode and the pointer can be prevented from being shielded by the common electrode. As a result, even when the display is driven by the VA type, the in-cell touch panel can be provided.

In the first or second configuration, the receiver electrode may be formed to extend in a direction intersecting the direction in which the transmitter electrode extends, and the width of the receiver electrode may be configured to be smaller than the width of the transmitter electrode (third configuration).

According to the third configuration described above, the width of the receiver electrode is small, and thus a coupling capacitance (load capacity) between the transmitter electrode and the receiver electrode can be reduced. As a result, a decrease of the signal from the receiver electrode due to the coupling capacitance can be prevented.

In any one or the first to third configurations, the plurality of color filters ma be disposed side by side in a first direction, the transmitter electrode may be formed to extend in a direction intersecting the first direction, and the receiver electrode may be formed to extend in a direction intersecting the first direction and in a direction intersecting a direction in which the transmitter electrode extends (fourth configuration). Moreover, in the fourth configuration, the in-cell touch panel may further include a transmitter terminal and a receiver terminal formed in one portion in a second direction orthogonal to a first direction of any one of the first substrate or the second substrate, a transmitter wiring line connected to one end portion of the transmitter electrode in the second direction, the transmitter wiring line being connected to the transmitter terminal, and a receiver wiring line connected to one end portion of the receiver electrode in the second direction, the receiver wiring line being connected to the receiver terminal (fifth configuration).

According to the fourth and fifth configurations described above, the transmitter wiring line and the receiver wiring line are both drawn to one side, and thus a space in which other components can be disposed can be formed in a portion closer to the other side with respect to the first substrate.

In any one of the first to third configurations, the plurality or color filters may be disposed side by side in a first direction, the transmitter electrode may be formed to extend in a direction orthogonal to the first direction, and the receiver electrode may be formed to extend parallel to the first direction (sixth configuration).

According to the sixth configuration, by forming the gap portion at a place where the transmitter electrode and the receiver electrode intersect with each other and at the position between adjacent ones of the plurality or color filters, the transmitter electrode and the receiver electrode can be easily prevented from being short-circuited.

In any one of the fourth to sixth configurations, the transmitter electrode may be configured to include a gap portion formed in a portion overlapping a space between adjacent ones of the plurality of color filters and the receiver electrode in a plan view (seventh configuration).

According to the seventh configuration described above, in a case where the transmitter electrode is formed to extend orthogonal to a direction in which the plurality of color filters are aligned, by forming the gap portion in the transmitter electrode, the transmitter electrode and the receiver electrode can be prevented from being short-circuited.

In the second or third configuration, the plurality of color filters may be disposed side by side in a first direction, the transmitter electrodes may be formed to extend parallel to the first direction, the receiver electrodes may be formed to extend in a direction orthogonal to the first direction, and the gap portion may be formed in a portion overlapping a space between adjacent ones of the plurality of color filters in a plan view in the receiver electrode (eighth configuration).

According to the eighth configuration described above, in a case where the transmitter electrode is formed to extend in the direction in which the plurality of color filters are aligned, by forming the gap portion in the receiver electrode, the transmitter electrode and the receiver electrode can be prevented from being short-circuited.

In any one of the first to eighth configurations, the in-cell touch panel may further include a reflective layer formed on a layer on an opposite side of the touch surface with respect to the first substrate and reflecting light incident from the touch surface side toward the touch surface side, the plurality of color filters may include a blue color filter, a red color filter, and a green color filter, and the gap portion may be provided from a portion overlapping a space between the green color filter and the blue color filter or between the green color filter and the red color filter in a plan view to a portion overlapping the green color filter in a plan view in at least one of the transmitter electrode and the receiver electrode (ninth configuration).

Here, in a reflection type display including the reflective layer, light needs to transmit through the transmitter electrode and the receiver electrode twice when being incident and reflected, and thus a loss of light (absorption or scatter) increases as compared with that of the transmission type. In view of this, the inventor of the disclosure focused on the fact that the luminosity factor of green is the highest among green, red, and blue, and conceived the above-described ninth configuration. According to the ninth configuration described above, since at least one of the transmitter electrode and the receiver electrode is not provided at a position overlapping the green color filter whose brightness and darkness are easily perceived by the humans, even when the transmitter electrode and the receiver electrode are formed on the layer on the opposite side of the touch surface with respect to the first substrate, the influence of the loss of light can be reduced.

In the ninth configuration, the gap portion may be provided from a portion overlapping a space between the green color filter and the blue color filter in a plan view to a portion overlapping the green color filter in a plan view and a portion overlapping the red color filter in a plan view in at least one of the transmitter electrode and the receiver electrode (tenth configuration).

According to the tenth configuration described above, since green and red have higher luminosity factor than that of blue, even when the transmitter electrode and the receiver electrode are formed on the layer on the opposite side of the touch surface with respect to the first substrate, the influence of the loss of light can be further reduced.

In any one of the first to tenth configurations, the in-cell touch panel may further include an overcoat film formed on a layer on an opposite side of the touch surface with respect to the plurality of color filters, the overcoat film including a contact hole in which a connection conductor connected to the transmitter electrode or the receiver electrode is formed on an inner side surface of the contact hole, and a wiring line section made of metal formed on the second substrate, wherein the connection conductor may be connected to the wiring line section made of the metal (eleventh configuration).

According to the eleventh configuration described above, wiring line resistance can be reduced by using the wiring line section made of the metal having a smaller resistance value than that of the transparent electrode. As a result, influences of the wiring line resistance on the signal to the transmitter electrode and the signal from the receiver electrode can be reduced. Furthermore, even when the drive circuit is provided on the second substrate, the transmitter electrode or the receiver electrode can be easily connected to the drive circuit by using the connection conductor in the contact hole and the wiring line section made of the metal.

In the configuration of any one of the first to eleventh configurations, the in-cell touch panel may further include a memory circuit disposed on the second substrate and connected to the pixel electrode, and a drive circuit for supplying a drive signal to the transmitter electrode, wherein the drive circuit may be configured to supply the drive signal to the transmitter electrode within a period in which data is written into the memory circuit (twelfth configuration).

According to the twelfth configuration described above, the period in which the data is written into the memory circuit and the period for supplying the drive signal to the transmitter electrode do not need to be time-divided. As a result, it is not necessary to design the drive circuit in accordance with the in-cell touch panel including the memory circuit, and thus a general-purpose drive circuit can be used, and versatility of the in-cell touch panel can be improved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An in-cell touch panel comprising:
a first substrate;

a plurality of color filters formed on a layer on an opposite side of a touch surface with respect to the first substrate;
a transmitter electrode;
a receiver electrode; and
a second substrate disposed to face the first substrate, a pixel electrode being disposed on the second substrate,
wherein the plurality of color filters is positioned between the transmitter electrode and the receiver electrode,
at least one of the transmitter electrode and the receiver electrode includes a gap portion formed in a portion of a space between adjacent color filters of the plurality of color filters in a plan view,
the plurality of color filters is disposed side by side in a first direction,
the transmitter electrode extends in a direction intersecting the first direction,
the receiver electrode extends in a direction intersecting the first direction and intersecting the direction in which the transmitter electrode extends, and
the gap portion is formed in a portion of a space between adjacent color filters of the plurality of color filters and the receiver electrode in a plan view in the transmitter electrode.

2. The in-cell touch panel according to claim 1, further comprising:
an overcoat film formed on the transmitter electrode; and
a common electrode formed on the overcoat film,
wherein the transmitter electrode is positioned closer than the overcoat film to the touch surface, and
the receiver electrode is positioned closer than the plurality of color filters to the touch surface.

3. The in-cell touch panel according to claim 1,
a width of the receiver electrode is smaller than a width of the transmitter electrode.

4. The in-cell touch panel according to claim 1, further comprising:
a transmitter terminal and a receiver terminal formed in one portion in a second direction orthogonal to the first direction of any one of the first substrate or the second substrate;
a transmitter wiring line connected to one end portion of the transmitter electrode in the second direction, the transmitter wiring line being connected to the transmitter terminal; and
a receiver wiring line connected to one end portion of the receiver electrode in the second direction, the receiver wiring line being connected to the receiver terminal.

5. The in-cell touch panel according to claim 1, further comprising
a reflective layer formed on a layer on an opposite side of the touch surface with respect to the first substrate and reflecting light incident from the touch surface side toward the touch surface side,
wherein the plurality of color filters include a blue color filter, a red color filter, a green color filter, and
the gap portion is provided from a portion of a space between the green color filter and the blue color filter or between the green color filter and the red color filter in a plan view to a portion of the green color filter in a plan view in at least one of the transmitter electrode and the receiver electrode.

6. The in-cell touch panel according to claim 5,
wherein the gap portion is provided from a portion of a space between the green color filter and the blue color filter in a plan view to a portion of the green color filter in a plan view and a portion of the red color filter in a plan view in at least one of the transmitter electrode and the receiver electrode.

7. The in-cell touch panel according to claim 1, further comprising:
an overcoat film formed on a layer on an opposite side of the touch surface with respect to the transmitter electrode, the overcoat film including a contact hole, a connection conductor connected to the transmitter electrode or the receiver electrode being formed on an inner side surface of the contact hole; and
a wiring line section made of a metal formed on the second substrate,
wherein the connection conductor is connected to the wiring line section made of the metal.

8. The in-cell touch panel according to claim 1, further comprising:
a memory circuit disposed on the second substrate and connected to the pixel electrode; and
a drive circuit configured to supply a drive signal to the transmitter electrode,
wherein the drive circuit is configured to supply the drive signal to the transmitter electrode within a period of data being written into the memory circuit.

* * * * *